United States Patent
Gu et al.

(10) Patent No.: US 12,463,856 B1
(45) Date of Patent: Nov. 4, 2025

(54) METHOD FOR COMPENSATING FOR NONLINEAR DISTORTION OF SIGNAL, MODEL, AND COMMUNICATION SYSTEM

(71) Applicant: CHONGQING SATELITE NETWORK SYSTEM CO., LTD., Chongqing (CN)

(72) Inventors: Linhai Gu, Chongqing (CN);
Guangnan Zou, Chongqing (CN);
Xuesong Wang, Chongqing (CN);
Bingqian Yu, Chongqing (CN)

(73) Assignee: CHONGQING SATELITE NETWORK SYSTEM CO., LTD., Chongqing (CN)

( * ) Notice: Subject to any disclaimer, the term of this patent is extended or adjusted under 35 U.S.C. 154(b) by 0 days.

(21) Appl. No.: 18/861,808

(22) PCT Filed: Nov. 17, 2023

(86) PCT No.: PCT/CN2023/132247
§ 371 (c)(1),
(2) Date: Jul. 8, 2025

(87) PCT Pub. No.: WO2025/102338
PCT Pub. Date: May 22, 2025

(51) Int. Cl.
*H04L 27/26* (2006.01)
*H03F 1/32* (2006.01)

(52) U.S. Cl.
CPC ....... *H04L 27/2614* (2013.01); *H03F 1/3241* (2013.01); *H04L 27/2627* (2013.01)

(58) Field of Classification Search
CPC ............. H04L 27/2614; H04L 27/2626; H03F 1/3241; H03F 1/3247; H04B 1/0475; H04B 2001/0425
See application file for complete search history.

(56) References Cited

U.S. PATENT DOCUMENTS

| | | | | |
|---|---|---|---|---|
| 8,446,979 B1 * | 5/2013 | Yee | ........................ | H03F 1/3247 375/295 |
| 9,509,350 B1 * | 11/2016 | Magesacher | .......... | H03F 1/3241 |
| 11,323,188 B2 * | 5/2022 | Li | ........................ | H04B 1/0475 |

(Continued)

FOREIGN PATENT DOCUMENTS

| | | |
|---|---|---|
| KR | 2014-0084295 A | 7/2014 |
| WO | WO 2023/083453 A1 | 5/2023 |

OTHER PUBLICATIONS

Notice of Allowance for Korean Patent Application No. 10-2024-7038280 dated Jul. 2, 2025 (14 pages).

(Continued)

*Primary Examiner* — Betsy Deppe
(74) *Attorney, Agent, or Firm* — ALSTON & BIRD LLP

(57) ABSTRACT

A method for compensating for nonlinear distortion of a signal, a model, and a communication system are disclosed. Based on a preset nonlinear compensation fusion model, digital pre-distortion (DPD), crest factor reduction (CFR) and error compensation are separately performed on an initial orthogonal frequency division multiplexing (OFDM) signal, and an initial OFDM signal after nonlinear distortion compensation is obtained accordingly. The nonlinear compensation fusion model may include a band limited-digital pre-distortion (BL-DPD) module, a band limited-crest factor reduction (BL-CFR) module and an error compensation module.

20 Claims, 8 Drawing Sheets

(56) References Cited

U.S. PATENT DOCUMENTS

| | | |
|---|---|---|
| 2011/0235760 A1 | 9/2011 | Yu et al. |
| 2015/0236730 A1 | 8/2015 | Zhao et al. |
| 2020/0068414 A1 | 2/2020 | Karimli et al. |
| 2021/0377088 A1 | 12/2021 | Gaal et al. |
| 2022/0357385 A1 | 11/2022 | Dupret et al. |
| 2023/0299800 A1 | 9/2023 | Kutz et al. |

OTHER PUBLICATIONS

International Search Report for PCT/CN2023/132247 (ISA/CN) dated Aug. 8, 2024, with English translation (8 pages).
Written Opinion for PCT/CN2023/132247 (ISA/CN) dated Aug. 8, 2024, with English translation (6 pages).

\* cited by examiner

METHOD FOR COMPENSATING FOR NONLINEAR DISTORTION OF SIGNAL, MODEL, AND COMMUNICATION SYSTEM

CROSS-REFERENCE TO RELATED APPLICATIONS

The present application is a national phase entry of International Application No. PCT/CN2023/132247, filed Nov. 17, 2023, which is incorporated herein by reference in its entirety.

TECHNICAL FIELD

The disclosure relates to the technical field of radio communication, in particular to a method for compensating for nonlinear distortion of a signal, a model, and a communication system.

BACKGROUND

The orthogonal frequency division multiplexing (OFDM) technology, which is a multi-carrier modulation technology, overcomes frequency selective fading and narrowband interference by dividing a carrier into several orthogonal sub-carriers.

Accordingly, a signal modulated with the OFDM technology, that is, an OFDM signal, usually features a non-constant envelope, a wide (frequency) band and a high peak-to-average power ratio (PAPR). However, the OFDM signal will inevitably introduce nonlinear distortion when passing through a power amplifier (PA).

In view of that, a simple power back-off method is generally adopted for guaranteeing desirable linearity of an output signal from the power amplifier. However, this method reduces the efficiency of the power amplifier and wastes resources. Then, in order to improve the efficiency of the power amplifier, the power amplifier is usually placed near the saturation point during working, which in turn causes serious in-band distortion, increases the bit error rate of a communication system, further produces out-of-band spectrum spread and interferes with adjacent channels.

On that account, the crest factor reduction (CFR) technology and the digital pre-distortion (DPD) technology are used at present for diminishing the influence of nonlinear distortion of the power amplifier. The CFR technology reduces the PAPR of the signal by reducing its peak. In this way, after the PAPR of the signal is reduced, the back-off value of the output peak power of the power amplifier can be reduced at the average power working point, and the efficiency of the power amplifier can be improved as a result. The DPD technology is an effective method for compensating for the nonlinear and memory effects of the power amplifier in a high efficiency area. It can be seen that the combination of the CFR technology and the DPD technology can satisfy the application demand for improvements in the efficiency of the power amplifier and a linearity index at the same time.

Thus, a CFR module and a DPD module are generally used in cascade in the related art for improving the efficiency of the power amplifier and the linearity. In a typical scheme of combining the CFR technology with the DPD technology, the DPD module is used after the CFR module.

However, since the DPD module is used after the CFR module in the cascade mode of the CFR module and DPD module, a signal of which PAPR reduces after peak clipping by the CFR module will have its PAPR increased again when passing through the DPD module. Further, the non-linearity of the power amplifier will cause spectrum spread of the output signal, and a higher sampling rate of an analog to digital converter (ADC)/a digital to analog converter (DAC) in the OFDM system will be required. As a result, the requirement for the convergence speed of hardware and algorithms will be raised, and the difficulty and cost of system implementation will be increased.

To this end, it is a pressing technical problem to effectively reduce the requirement for the ADC/DAC sampling rate and improve the compensation of the DPD for the nonlinearity of the power amplifier.

SUMMARY

Embodiments of the disclosure provide a method for compensating for nonlinear distortion of a signal, a model, and a communication system for reducing a requirement for a sampling rate of an analog to digital converter (ADC)/a digital to analog converter (DAC), improving compensation performance of digital pre-distortion (DPD) for nonlinearity of a power amplifier, and further improving communication performance and perception performance of an orthogonal frequency division multiplexing (OFDM) system.

In a first aspect, the embodiment of the disclosure provides a method for compensating for nonlinear distortion of a signal. The method includes: inputting an initial orthogonal frequency division multiplexing (OFDM) signal into a preset nonlinear compensation fusion model, where the nonlinear compensation fusion model includes a band limited-digital pre-distortion (BL-DPD) module, a band limited-crest factor reduction (BL-CFR) module and an error compensation module, and the error compensation module is configured to perform error compensation on OFDM signals that are output by the BL-DPD module and the BL-CFR module; obtaining a first OFDM signal, a second OFDM signal and a third OFDM signal after the initial OFDM signal is processed by the BL-DPD module, the BL-CFR module and the error compensation module respectively; and obtaining, based on the first OFDM signal, the second OFDM signal and the third OFDM signal, an initial OFDM signal after nonlinear distortion compensation.

In an optional embodiment, a basis function adopted by the BL-DPD module and a basis function adopted by the BL-CFR module are the same.

In an optional embodiment, the obtaining a first OFDM signal, a second OFDM signal and a third OFDM signal after the initial OFDM signal is processed by the BL-DPD module, the BL-CFR module and the error compensation module respectively includes: obtaining the first OFDM signal, the second OFDM signal and the third OFDM signal by modulating the initial OFDM signal based on model parameter sets, that are converged in an offline mode, of the BL-DPD module, the BL-CFR module and the error compensation module respectively.

In an optional embodiment, the model parameter set includes any one of the following parameter combinations: a kernel coefficient, a nonlinear order, a memory depth, and an order of a low-order low-pass filter (LPF) of the BL-DPD module; a kernel coefficient, a nonlinear order, a memory depth, and an order of a low-order LPF of the BL-CFR module; or a kernel coefficient, a nonlinear order and a memory depth of the error compensation module.

In an optional embodiment, under the condition that the parameter combination of the model parameter set includes the kernel coefficient, the nonlinear order, the memory depth, and the order of the low-order LPF of the BL-DPD module, the model parameter set is obtained by the following method: inputting a sample OFDM signal that is in an offline mode into the BL-DPD module and obtaining a sample OFDM signal after DPD; obtaining, based on the sample OFDM signal after the DPD and a conjugate parameter set corresponding to an initial parameter set of the BL-DPD module, a sample OFDM signal after inverse DPD; obtaining a target DPD error signal based on the sample OFDM signal that is in the offline mode and the sample OFDM signal after the inverse DPD; iteratively modifying the initial parameter set based on the target DPD error signal and a preset low noise variable step size-least mean square algorithm until an absolute value of the target DPD error signal is less than a DPD error signal threshold that is set; and taking, as the model parameter set of the BL-DPD module, an initial parameter set after iteratively modified.

In an optional embodiment, the obtaining, based on the sample OFDM signal after the DPD and a conjugate parameter set corresponding to an initial parameter set of the BL-DPD module, a sample OFDM signal after inverse DPD processing includes: sequentially performing digital-to-analog conversion, up conversion and power amplification on the sample OFDM signal after the DPD and obtaining a sample OFDM signal after the power amplification; sequentially performing power attenuation, down conversion and analog-to-digital conversion on the sample OFDM signal after the power amplification and obtaining a sample OFDM signal after the analog-to-digital conversion; and obtaining, based on the sample OFDM signal after the analog-to-digital conversion and the conjugate parameter set corresponding to the initial parameter set, the sample OFDM signal after the inverse DPD.

In an optional embodiment, the iteratively modifying the initial parameter set based on the target DPD error signal and a preset low noise variable step size-least mean square algorithm includes: executing operations during each modification of the initial parameter set as follows: obtaining sample OFDM signals that correspond to a plurality of historical moments respectively and are currently adjacent to the sample OFDM signal that is in the offline mode; obtaining a DPD error signal average of the sample OFDM signal that is in the offline mode at a current moment based on historical DPD error signals corresponding to the plurality of sample OFDM signals; obtaining a first target step size factor based on the DPD error signal average, a step size factor at a last historical moment that is adjacent to the current moment, a target DPD error signal that is at the current moment and a historical DPD error signal that is at the last historical moment; and modifying an initial parameter set that is at the current moment based on the first target step size factor, a conjugate DPD error signal corresponding to the target DPD error signal that is at the current moment, and the sample OFDM signal after the analog-to-digital conversion, and obtaining an initial parameter set after modification.

In an optional embodiment, before the iteratively modifying the initial parameter set based on the target DPD error signal and a preset low noise variable step size-least mean square algorithm, the method further includes: directly taking the initial parameter set as the model parameter set of the BL-DPD module under the condition that the absolute value of the target DPD error signal is not less than the DPD error signal threshold.

In an optional embodiment, under the condition that the parameter combination of the model parameter set includes the kernel coefficient, the nonlinear order, the memory depth, and the order of the low-order LPF of the BL-CFR module, the model parameter set is obtained by the following method: inputting a sample OFDM signal that is in an offline mode sequentially into the BL-DPD module and a preset CFR module, and obtaining a sample OFDM signal after DPD-CFR; obtaining, based on the sample OFDM signal that is in the offline mode and a conjugate parameter set corresponding to an initial parameter set of the BL-CFR module, a sample OFDM signal after CFR; obtaining a target CFR error signal based on the sample OFDM signal after the DPD-CFR and the sample OFDM signal after the CFR; iteratively modifying the initial parameter set based on the target CFR error signal and a preset low noise variable step size-least mean square algorithm until an absolute value of the target CFR error signal is less than a CFR error signal threshold that is set; and taking, as the model parameter set of the BL-CFR module, an initial parameter set after iteratively modified.

In an optional embodiment, before the iteratively modifying the initial parameter set based on the target CFR error signal and a preset low noise variable step size-least mean square algorithm, the method further includes: directly taking the initial parameter set as the model parameter set of the BL-CFR module under the condition that the absolute value of the target CFR error signal is not less than the CFR error signal threshold.

In an optional embodiment, under the condition that the parameter combination of the model parameter set includes the kernel coefficient, the nonlinear order and the memory depth of the error compensation module, the model parameter set is obtained by the following method: obtaining a sample OFDM signal after nonlinear distortion compensation and a sample OFDM signal after filtering by inputting a sample OFDM signal that is in an offline mode into the nonlinear compensation fusion model and a preset high-order LPF respectively; obtaining a target compensation error signal based on the sample OFDM signal after the nonlinear distortion compensation and the sample OFDM signal after the filtering; iteratively modifying an initial parameter set of the error compensation module based on the target compensation error signal and a preset low noise variable step size-least mean square algorithm until an absolute value of the target compensation error signal is less than a set compensation error signal threshold; and taking, as the model parameter set of the error compensation module, an initial parameter set after iteratively modified.

In an optional embodiment, before the iteratively modifying an initial parameter set of the error compensation module based on the target compensation error signal and a preset low noise variable step size-least mean square algorithm, the method further includes: directly taking the initial parameter set as the model parameter set of the error compensation module under the condition that the absolute value of the target compensation error signal is not less than the compensation error signal threshold.

In an optional embodiment, after the obtaining, based on the first OFDM signal, the second OFDM signal and the third OFDM signal, an initial OFDM signal after nonlinear distortion compensation, the method further includes: obtaining, based on the initial OFDM signal after the nonlinear distortion compensation and a conjugate parameter set corresponding to a model parameter set of the BL-DPD module, an initial OFDM signal after inverse DPD; obtaining a target distortion compensation error signal based on the initial OFDM signal after the nonlinear distortion compensation and the initial OFDM signal after the inverse DPD; and iteratively modifying the model parameter set based on the target distortion compensation error signal and a preset sine and error variable step size-least mean square algorithm until an absolute value of the target distortion compensation error signal is less than a set distortion compensation error threshold.

In an optional embodiment, the obtaining, based on the initial OFDM signal after the nonlinear distortion compensation and a conjugate parameter set corresponding to a model parameter set of the BL-DPD module, an initial OFDM signal after inverse DPD processing includes: sequentially performing digital-to-analog conversion, up conversion and power amplification on the initial OFDM signal after the nonlinear distortion compensation and obtaining an initial OFDM signal after the power amplification; sequentially performing power attenuation, down conversion and analog-to-digital conversion on the initial OFDM signal after the power amplification and obtaining an initial OFDM signal after the analog-to-digital conversion; and obtaining, based on the initial OFDM signal after the analog-to-digital conversion and the conjugate parameter set corresponding to the model parameter set, the initial OFDM signal after the inverse DPD.

In an optional embodiment, the iteratively modifying the model parameter set based on the target distortion compensation error signal and a preset sine and error variable step size-least mean square algorithm includes: performing operations during each modification of the model parameter set as follows: obtaining sample OFDM signals that are obtained after nonlinear distortion compensation, correspond to a plurality of historical moments respectively and are currently adjacent to the initial OFDM signal after the nonlinear distortion compensation; obtaining a distortion compensation error signal average of the initial OFDM signal after the nonlinear distortion compensation at a current moment based on historical distortion compensation error signals corresponding to the plurality of sample OFDM signals after nonlinear distortion compensation; obtaining a second target step size factor based on an error term corresponding to the distortion compensation error signal average, a target distortion compensation error signal that is at the current moment, and a historical distortion compensation error signal at a last historical moment that is adjacent to the current moment; and modifying a model parameter set that is at the current moment based on the second target step size factor, a conjugate distortion compensation error signal corresponding to the target distortion compensation error signal that is at the current moment, and an initial OFDM signal after analog-to-digital conversion, and obtaining a model parameter set after modification.

In an optional embodiment, the method further includes: iteratively modifying the model parameter set of the BL-DPD module according to set cycle time.

In a second aspect, the embodiment of the disclosure further provides a nonlinear compensation fusion model. The nonlinear compensation fusion model includes: a BL-DPD module, a BL-CFR module and an error compensation module; where the BL-DPD module, the BL-CFR module and the error compensation module are connected in parallel, the BL-DPD module and the BL-CFR module adopt the same basis function and the error compensation module is configured to perform error compensation on OFDM signals that are output by the BL-DPD module and the BL-CFR module.

In an optional embodiment, a basis function adopted by the BL-DPD module and a basis function adopted by the BL-CFR module are the same.

In an optional embodiment, the nonlinear compensation fusion model is configured to: obtain a first OFDM signal, a second OFDM signal and a third OFDM signal after an initial OFDM signal is processed by the BL-DPD module, the BL-CFR module and the error compensation module respectively; and obtain, based on the first OFDM signal, the second OFDM signal and the third OFDM signal, an initial OFDM signal after nonlinear distortion compensation.

In an optional embodiment, the nonlinear compensation fusion model is further configured to: extract, in an offline mode, a model parameter set from the BL-DPD module, the BL-CFR module and the error compensation module by using a preset low noise variable step size-least mean square algorithm.

In an optional embodiment, the nonlinear compensation fusion model is further configured to: refresh, in an online mode, a model parameter set of the nonlinear compensation fusion model by using a preset sine and error variable step size-least mean square algorithm and based on preset cycle time.

In an optional embodiment, the nonlinear compensation fusion model is specifically configured to: refresh, in an online mode, a model parameter set of the BL-DPD module in the nonlinear compensation fusion model merely by using the preset sine and error variable step size-least mean square algorithm and based on the preset cycle time.

In a third aspect, the embodiment of the disclosure further provides an OFDM communication system. The OFDM communication system includes the nonlinear compensation fusion model according to the second aspect, a first branch, a second branch, a third branch and a fourth branch, where the BL-DPD module in the nonlinear compensation fusion model and the first branch are configured to iteratively modify an initial parameter set of the BL-DPD module in an offline mode and obtain a model parameter set of the BL-DPD module; the BL-CFR module in the nonlinear compensation fusion model and the second branch are configured to iteratively modify an initial parameter set of the BL-CFR module in an offline mode and obtain a model parameter set of the BL-CFR module; the nonlinear compensation fusion model and the third branch are configured to iteratively modify an initial parameter set of an error compensation module in an offline mode and obtain a model parameter set of the error compensation module; and the nonlinear compensation fusion model and the fourth branch are configured to iteratively modify the model parameter set of the BL-DPD module in an online mode.

In an optional embodiment, the first branch includes a digital to analog converter (DAC), an up-converter, a power amplifier (PA), an attenuator, a band pass filter (BPF), a down-converter, an analog to digital converter (ADC), a training network POST-BL-DPD module and a preset low noise variable step size-least mean square algorithm module that are sequentially arranged.

In an optional embodiment, the second branch includes a CFR module, a training network POST-BL-DPD module and a preset low noise variable step size-least mean square algorithm module that are sequentially arranged.

In an optional embodiment, the third branch includes a low pass filter (LPF) and a preset low noise variable step size-least mean square algorithm module that are sequentially arranged.

In an optional embodiment, the fourth branch includes the DAC, the up-converter, the PA, the attenuator, the BPF, the down-converter, the ADC, the training network POST-BL- DPD module and a preset sine and error variable step size-least mean square algorithm module that are sequentially arranged.

In a fourth aspect, an electronic device is provided. The electronic device includes a processor and a memory, where the memory stores a program code, and when the program code is executed by the processor, the processor is caused to execute steps of the method for compensating for nonlinear distortion of a signal according to the first aspect.

In a fifth aspect, a computer-readable storage medium is provided. The computer-readable storage medium includes a program code, where when the program code is run on an electronic device, the program code causes the electronic device to execute steps of the method for compensating for nonlinear distortion of a signal according to the first aspect.

In a sixth aspect, a computer program product is provided. When the computer program product is called by a computer, the computer is caused to execute steps of the method for compensating for nonlinear distortion of a signal according to the first aspect.

The disclosure has the following beneficial effects.

In the method for compensating for nonlinear distortion of a signal according to the embodiment of the disclosure, based on the preset nonlinear compensation fusion model, the DPD, the CFR and the error compensation are separately performed on the initial OFDM signal, and the initial OFDM signal after the nonlinear distortion compensation is obtained accordingly based on the first OFDM signal, the second OFDM signal and the third OFDM signal after the initial OFDM signal is processed by the BL-DPD module, the BL-CFR module and the error compensation module respectively. In this way, through a parallel connection of the BL-DPD module, the BL-CFR module and the error compensation module that are in the preset nonlinear compensation fusion model, the technical disadvantages that in the prior art, a DPD module is applied after a CFR module, a higher sampling rate of an ADC/DAC in an OFDM system is required, the requirements for hardware and algorithm convergence speed are increased, and difficulty and cost of system implementation are increased are avoided. As a result, the requirement for the sampling rate of the ADC/DAC is effectively reduced, compensation performance of the DPD for nonlinearity of a power amplifier is further improved, and communication performance and perception performance of an OFDM system are further improved as well.

In addition, other features and advantages of the disclosure will be set forth in the following description, and will partially become apparent in the description, or can be learned by implementing the disclosure. An objective and other advantages of the disclosure can be achieved and obtained through structures particularly indicated in the description, the claims and accompanying drawings.

BRIEF DESCRIPTION OF FIGURES

To describe technical solutions of embodiments of the disclosure more clearly, accompanying drawings required for description of the embodiments will be briefly described below. Apparently, the accompanying drawings in the following description merely show some embodiments of the disclosure, and a person of ordinary skill in the art can derive other accompanying drawings from these accompanying drawings without creative efforts. In the accompanying drawings.

DETAILED DESCRIPTION

Figure 1:
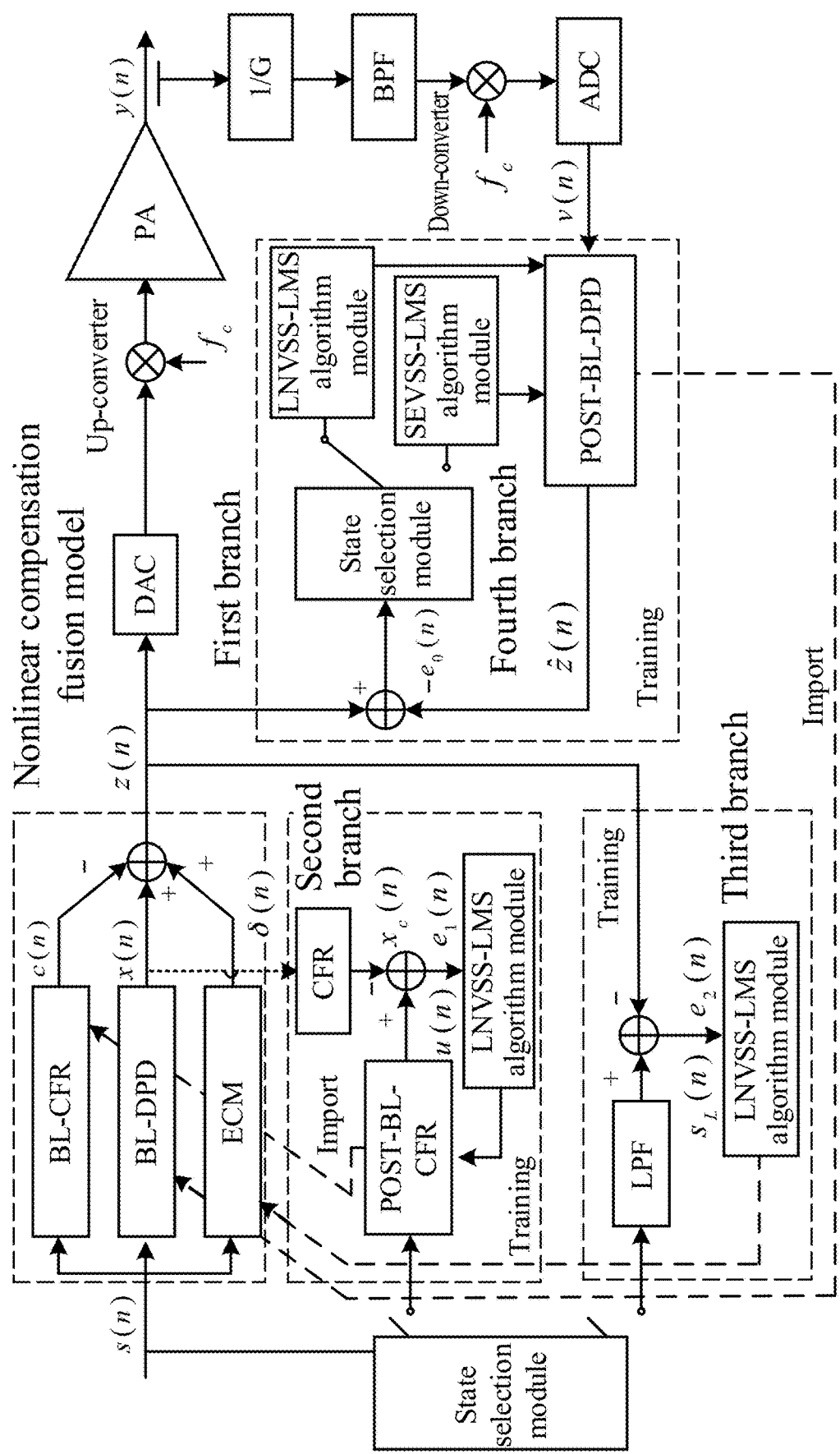
FIG. 1 is a schematic diagram of a composition structure of an orthogonal frequency division multiplexing (OFDM) communication system according to an embodiment of the disclosure.

To make objectives, technical solutions, and advantages of embodiments of the disclosure clearer, the technical solutions of the disclosure will be clearly and completely described below with reference to accompanying drawings in the embodiments of the disclosure. Apparently, the embodiments described are some embodiments rather than all embodiments of the technical solutions of the disclosure. All other embodiments derived by a person of ordinary skill in the art from the embodiments described in the text of the disclosure without creative efforts shall fall within the protection scope of the technical solution of the disclosure.

It should be noted that "a plurality of" in the description of the disclosure is understood as "at least two". Herein, "and/or" is used to describe an association between associated objects and means three relations, for example, A and/or B can mean A alone, both A and B, and B alone. A case that A is connected to B can indicate two cases: A is directly connected to B and A is connected to B through C. In addition, in the description of the disclosure, the terms "first", "second", etc. are merely used for distinguishing description and cannot be understood as indicating or implying relative importance, or indicating or implying order.

At first, a design idea of the embodiment of the disclosure is briefly introduced as follows The orthogonal frequency division multiplexing (OFDM) technology, a multi-carrier modulation technology, overcomes frequency selective fading and narrowband interference by dividing a carrier into several orthogonal subcarriers. Based on that, an OFDM signal, a communication signal of the global 5th generation mobile networks new radio (5G NR) based on new radio design of OFDM, has more choices in terms of a time slot, a subcarrier, etc. that can be included in each subframe. Then, the OFDM signal can not only support different communication scenarios, but also effectively support different perceptual scenarios.

Accordingly, a signal modulated with the OFDM technology, that is, the OFDM signal, usually features a non-constant envelope, a wide (frequency) band and a high peak-to-average power ratio (PAPR). However, the OFDM signal will inevitably introduce nonlinear distortion when passing through a power amplifier (PA).

In view of that, a simple power back-off method is generally adopted for guaranteeing desirable linearity of an output signal from the power amplifier. However, this method reduces the efficiency of the power amplifier and wastes resources. Then, in order to improve the efficiency of the power amplifier, the power amplifier is usually placed near the saturation point during working, which in turn causes serious in-band distortion, increases the bit error rate of a communication system, further produces out-of-band spectrum spread and interferes with adjacent channels.

At present, in order to weaken influence of PA nonlinear distortion, advantages of crest factor reduction (CFR) technology and digital pre-distortion (DPD) technology are combined, so as to satisfy the application requirements or purposes of improving efficiency of the power amplifier and a linearity index at the same time.

Specifically, in a typical solution of combining the CFR technology with the DPD technology, a DPD module is usually applied after the CFR module. However, in the cascade manner of the CFR module and the DPD module, since the DPD module is used after the CFR module, a signal whose PAPR reduces after peak clipping by the CFR module will have its PAPR increased again when passing through the DPD module. Further, the nonlinearity of the power amplifier will cause spectrum spread of an output signal. When DPD is implemented, a bandwidth of a feedback receiving channel is 3-5 times the size of an input signal bandwidth. For a bandwidth greater than or equal to 400 MHZ, a sampling rate of an analog to digital converter (ADC) of the feedback receiving channel requires at least 4 Gsps. The ADC with such a high sampling rate increases the requirements for hardware and algorithm convergence speed, and further increases difficulty and cost of system implementation.

In view of this, in order to effectively reduce the sampling rate of the analog to digital converter (ADC)/a digital to analog converter (DAC), simultaneously reduce influence of peak clipping (CFR) on a DPD effect as much as possible, and improve communication performance and perception performance of 5G NR (such as an OFDM system), a method for compensating for nonlinear distortion is provided in the embodiment of the disclosure. The method specifically includes: an OFDM signal is input into a preset nonlinear compensation fusion model, where the nonlinear compensation fusion model includes a band limited-digital pre-distortion (BL-DPD) module, a band limited-crest factor reduction (BL-CFR) module and an error compensation module, and the error compensation module is configured to perform error compensation on OFDM signals that are output by the BL-DPD module and the BL-CFR module. Further, a first OFDM signal, a second OFDM signal and a third OFDM signal after the initial OFDM signal is processed by the BL-DPD module, the BL-CFR module and the error compensation module respectively are obtained. Finally, based on the first OFDM signal, the second OFDM signal and the third OFDM signal, an initial OFDM signal after nonlinear distortion compensation is obtained.

In particular, preferred embodiments of the disclosure will be described below with reference to the accompanying drawings of the description. It should be understood that the preferred embodiments described herein are merely used for describing and explaining the disclosure, rather than limiting the disclosure, and the embodiments of the disclosure and features in the embodiments can be combined with one another if there is no conflict.

With reference to FIG. 1, a schematic diagram of a composition structure of an OFDM communication system according to an embodiment of the disclosure is shown. The OFDM communication system includes a nonlinear compensation fusion model, a first branch, a second branch, a third branch and a fourth branch.

The nonlinear compensation fusion model includes the BL-DPD module, the BL-CFR module and the error compensation module, the BL-DPD module, the BL-CFR module and the error compensation module are connected in parallel, and the error compensation module is configured to perform error compensation on OFDM signals that are output by the BL-DPD module and the BL-CFR module.

Optionally, a basis function adopted by the BL-DPD module and a basis function adopted by the BL-CFR module are the same.

The first branch includes a DAC, an up-converter, a PA, an attenuator 1/G, a band pass filter (BPF), a down-converter, an ADC, a training network POST-BL-DPD module and a preset low noise variable step size-least mean square (LNVSS-LMS) algorithm module that are sequentially arranged.

The second branch includes a CFR module, a training network POST-BL-DPD module and a preset low noise variable step size-least mean square algorithm module that are sequentially arranged.

The third branch includes a low pass filter (LPF) and a preset low noise variable step size-least mean square algorithm module that are sequentially arranged.

The fourth branch includes the DAC, the up-converter, the PA, the attenuator 1/G, the BPF, the down-converter, the ADC, the training network POST-BL-DPD module and a preset sine and error variable step size-least mean square (SEVSS-LMS) algorithm module that are sequentially arranged.

It can be seen that a difference between the first branch and the fourth branch merely lies in that the first branch adopts an LNVSS-LMS algorithm, while the fourth branch adopts an SEVSS-LMS algorithm. The LNVSS-LMS algorithm adjusts a change in a step size factor function by using parameters such as absolute error energy of error energy at a current moment and a previous moment, and an average; and this algorithm can effectively restrain the step size factor function from being affected by noise, further enhance an anti-noise capacity of the LNVSS-LMS algorithm, and can obtain a smaller step size and smaller steady-state error by adjusting a parameter value to be smaller than an error value at this moment. The SEVSS-LMS algorithm controls a variable step size factor function by adjusting three parameters, such that a step size of the variable step size factor function automatically increases and a convergence speed is fast at an initial stage with a large error signal; and after reaching a steady state, a small step size and a slow convergence speed can be maintained and a small error is achieved.

Further, the above nonlinear compensation fusion model can also be referred to as a compensation band limited-CFR-DPD (CBL-CFR-DPD) model.

In addition, the first branch, the second branch and the third branch may share the same preset low noise variable step size-least mean square algorithm module to save circuit overhead. It should be noted that in the embodiment of the disclosure, a number of preset low noise variable step size-least mean square algorithm modules is not limited.

It is worth pointing out that in the embodiment of the disclosure, the nonlinear compensation fusion model is configured to perform DPD, CFR and error compensation on the initial OFDM signal separately, obtain the first OFDM signal, the second OFDM signal and the third OFDM signal after the initial OFDM signal is performed by the BL-DPD module, the BL-CFR module and the error compensation module respectively, and obtain the initial OFDM signal after the nonlinear distortion compensation based on the first OFDM signal, the second OFDM signal and the third OFDM signal.

The BL-DPD module in the nonlinear compensation fusion model and the first branch are configured to iteratively modify an initial parameter set of the BL-DPD module in an offline mode and obtain a model parameter set of the BL-DPD module, that is, a kernel parameter of the BL-DPD module is extracted in an offline mode. The offline mode represents that no initial OFDM signal is received, that is, a module/model (pre-) training mode.

The BL-CFR module in the nonlinear compensation fusion model and the second branch are configured to iteratively modify an initial parameter set of the BL-CFR module in an offline mode and obtain a model parameter set of the BL-CFR module, that is, a kernel parameter of the BL-DPD module is extracted in an offline mode.

The nonlinear compensation fusion model and the third branch are configured to iteratively modify an initial parameter set of the error compensation module (ECM) in an offline mode and obtain a model parameter set of the error compensation module, that is, a kernel parameter of the error compensation module (ECM) is extracted in an offline mode.

The nonlinear compensation fusion model and the fourth branch are used to iteratively modify the model parameter set of the BL-DPD module in an online mode, that is, the parameter of the nonlinear compensation fusion model (CBL-CFR-DPD model) is effectively refreshed in an online mode. Finally, it is guaranteed that pre-distortion of the entire OFDM communication system in cascade can effectively improve distortion of the OFDM signal caused by the nonlinearity of the power amplifier and improve the efficiency of the entire OFDM communication system. The online mode represents that the initial OFDM signal is received, that is, a real-time working mode.

Optionally, the nonlinear compensation fusion model is further configured to extract, in an offline mode, a model parameter set from the BL-DPD module, the BL-CFR module and the error compensation module by using a preset low noise variable step size-least mean square algorithm; and/or, refresh, in an online mode, a model parameter set of the nonlinear compensation fusion model by using a preset sine and error variable step size-least mean square algorithm and based on preset cycle time. Optionally, the nonlinear compensation fusion model is specifically configured to refresh, in an online mode, a model parameter set of the BL-DPD module in the nonlinear compensation fusion model merely by using the preset sine and error variable step size-least mean square algorithm and based on the preset cycle time.

It should also be noted that the Mode in FIG. 1 can be understood as a state selection module, so a corresponding state can be an offline mode or online mode.

Apparently, based on the OFDM communication system, a novel nonlinear compensation fusion model (i.e., a CBL-CFR-DPD integrated model) is built, the BL-DPD module and the BL-CFR module are integrated into one model through the error compensation module (ECM), and the parameters of the modules (i.e., the model parameter set) are extracted and updated by an "offline+online" mechanism. In the offline mode, the LNVSS-LMS adaptive algorithm is configured to extract/modify the parameter of the BL-DPD module, the BL-CFR module and the ECM module. In the online mode, the SEVSS-LMS adaptive algorithm is configured to merely refresh/modify the parameter of the BL-DPD module effectively. In this way, an order of a band-limited filter is effectively reduced, complexity of the entire nonlinear compensation fusion model is reduced, and precision of the entire nonlinear compensation fusion model is guaranteed at the same time. In addition, the nonlinear compensation fusion model has operational complexity equivalent to that of a system that merely has a DPD module, except for addition and subtraction operations of some coefficients, is reduced in operational complexity compared with a typical solution of independent application of the CFR module and the DPD module, and can effectively improve compensation by a digital predistorter for nonlinear performance of a broadband power amplifier.

A method for compensating for nonlinear distortion of a signal according to an illustrative implementation of the disclosure will be described below in conjunction with the above OFDM communication system and with reference to the accompanying drawings. It should be noted that the above system architecture is merely shown for the convenience of understanding of the spirit and principle of the disclosure, and the implementation of the disclosure is not limited in this respect.

Figure 2:
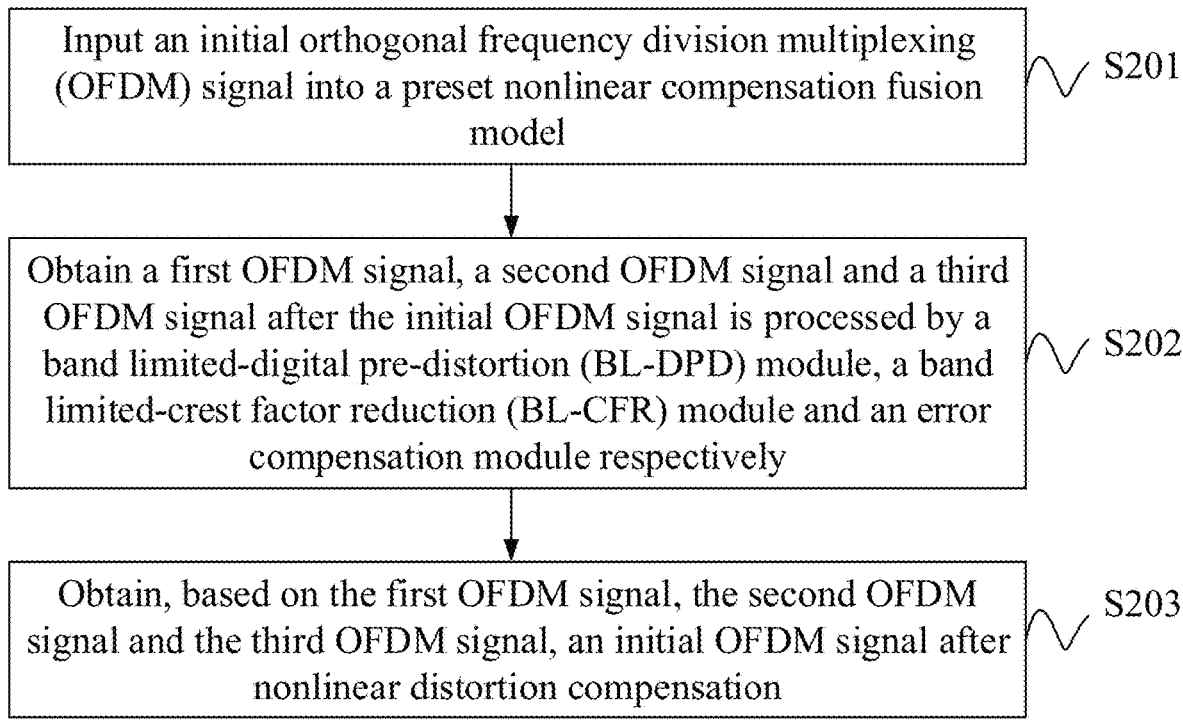
FIG. 2 is a schematic flowchart of implementing a method for compensating for nonlinear distortion of a signal according to an embodiment of the disclosure.

With reference to FIG. 2, a schematic flowchart of implementing a method for compensating for nonlinear distortion of a signal according to an embodiment of the disclosure is shown. The method is applied to the above OFDM communication system, and specific implementation flow of the method is as follows.

S201: an initial OFDM signal is input into a preset nonlinear compensation fusion model.

The nonlinear compensation fusion model includes the BL-DPD module, the BL-CFR module and the error compensation module, and the error compensation module is configured to perform error compensation on OFDM signals that are output by the BL-DPD module and the BL-CFR module.

It should be noted that the BL-DPD module and the BL-CFR module adopt the same basis function and different model parameter sets (i.e., coefficients).

S202: a first OFDM signal, a second OFDM signal and a third OFDM signal after the initial OFDM signal is processed by the BL-DPD module, the BL-CFR module and the error compensation module respectively are separately obtained.

Figure 3:
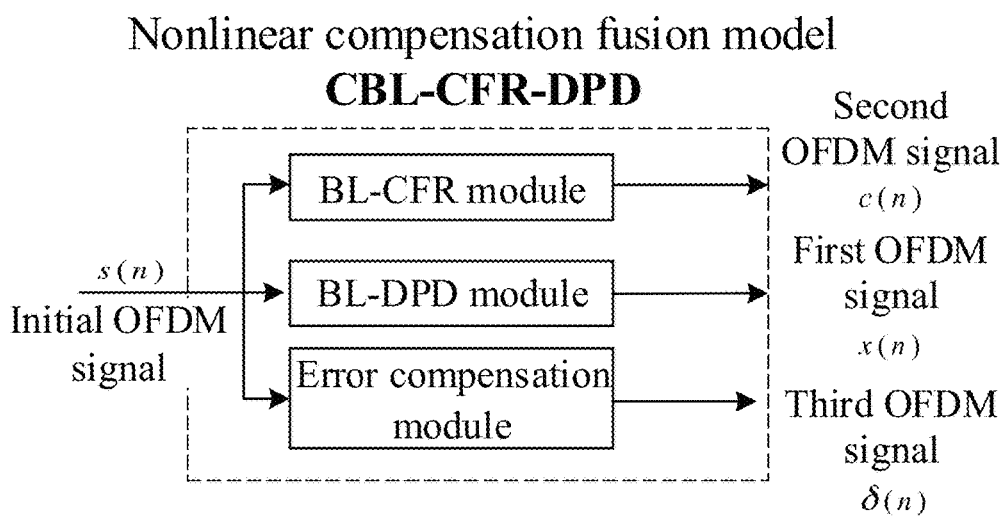
FIG. 3 is a schematic diagram of logic for processing an initial OFDM signal according to an embodiment of the disclosure.

In an optional implementation, when S202 is executed with reference to FIG. 3, the nonlinear compensation fusion model obtains the first OFDM signal, the second OFDM signal and the third OFDM signal by modulating the initial OFDM signal based on model parameter sets, that are converged in an offline mode, of the BL-DPD module, the BL-CFR module and the error compensation module (ECM) respectively. The offline mode represents that no initial OFDM signal is received. In this way, the initial OFDM signal is processed by three parallel modules, such that the technical disadvantages that in the prior art, a DPD module is applied after a CFR module, a higher sampling rate of an ADC/DAC in an OFDM system is required, the requirements for hardware and algorithm convergence speed are increased, and difficulty and cost of system implementation are increased are effectively avoided.

Illustratively, it is assumed that the initial OFDM signal is s(n), the first OFDM signal x(n) is obtained through kernel processing by the BL-DPD module. A computation formula of the first OFDM signal x(n) is specifically as follows:

$$x(n) = \sum_{k=1}^{K_1}\sum_{m=0}^{M_1}\sum_{l=0}^{L} a_{kml}\, s(n-m-l)|s(n-m-l)|^{k-1}.$$

Where $a_{kml}$, $K_1$ and $M_1$ denote a kernel coefficient, a nonlinear order and a memory depth of the BL-DPD module, L denotes an order of a low-order LPF in the BL-DPD module, that is, a model parameter set that is converged by the BL-DPD module in an offline mode; optionally, L is less than 16.

The initial OFDM signal s(n) is subjected to kernel processing by the BL-CFR module, so as to obtain a second OFDM signal c(n). A computation formula of the second OFDM signal c(n) is specifically as follows:

$$c(n) = \sum_{k=1}^{K_1}\sum_{m=0}^{M_1}\sum_{l=0}^{L} b_{kml}\, s(n-m-l)|s(n-m-l)|^{k-1}.$$

Where $b_{kml}$, $K_1$ and $M_1$ denote a kernel coefficient, a nonlinear order and a memory depth of the BL-CFR module, L denotes an order of a low-order LPF in the BL-CFR module, that is, a model parameter set that is converged by the BL-CFR module in an offline mode; optionally, the order L is less than 16.

The initial OFDM signal s(n) is subjected to kernel processing by the error compensation module (ECM), so as to obtain a third OFDM signal δ(n). A computation formula of the third OFDM signal δ(n) is specifically as follows:

$$\delta(n) = \sum_{k=1}^{K_2}\sum_{m=0}^{M_2} c_{km}\, s(n-m)|s(n-m)|^{k-1}.$$

Where $c_{km}$, $K_2$ and $M_2$ denote a kernel coefficient, a nonlinear order and a memory depth of the error compensation module (ECM), that is, the model parameter set that is converged by the error compensation module (ECM) in an offline mode.

As a result, it can be seen that the model parameter set includes any one of the following parameter combinations: 1, a kernel coefficient, a nonlinear order, a memory depth, and an order of a low-order LPF of the BL-DPD module; 2, a kernel coefficient, a nonlinear order, a memory depth, and an order of a low-order LPF of the BL-CFR module; or 3, a kernel coefficient, a nonlinear order and a memory depth of the error compensation module (ECM).

S203: based on the first OFDM signal, the second OFDM signal and the third OFDM signal, an initial OFDM signal after nonlinear distortion compensation is obtained.

Specifically, when S203 is executed, the nonlinear compensation fusion model obtains the first OFDM signal, the second OFDM signal and the third OFDM signal after the initial OFDM signal is performed by the BL-DPD module, the BL-CFR module and the error compensation module respectively, and then, may obtain the initial OFDM signal after the nonlinear distortion compensation based on the first OFDM signal, the second OFDM signal and the third OFDM signal.

Illustratively, it is still assumed that the initial OFDM signal is s(n), an initial OFDM signal z(n) after nonlinear distortion compensation is obtained through kernel processing by the nonlinear compensation fusion model (i.e., a CBL-CFR-DPD model). A computation formula of the initial OFDM signal z(n) after nonlinear distortion compensation is specifically as follows:

$$z(n) = x(n) - c(n) + \delta(n) = \sum_{k=1}^{K_1}\sum_{m=0}^{M_1}\sum_{l=0}^{L} a_{kml}\, s(n-m-l)|s(n-m-l)|^{k-1} - \sum_{k=1}^{K_1}\sum_{m=0}^{M_1}\sum_{l=0}^{L} b_{kml}\, s(n-m-l)|s(n-m-l)|^{k-1} + \sum_{k=1}^{K_2}\sum_{m=0}^{M_2} c_{km}\, s(n-m)|s(n-m)|^{k-1}.$$

It should be noted that the model parameter sets, that are converged in an offline mode, of the BL-DPD module, the BL-CFR module and the error compensation module respectively are obtained by the nonlinear compensation fusion model and the first branch, the nonlinear compensation fusion model and the second branch, and the nonlinear compensation fusion model and the third branch respectively.

Figure 4:
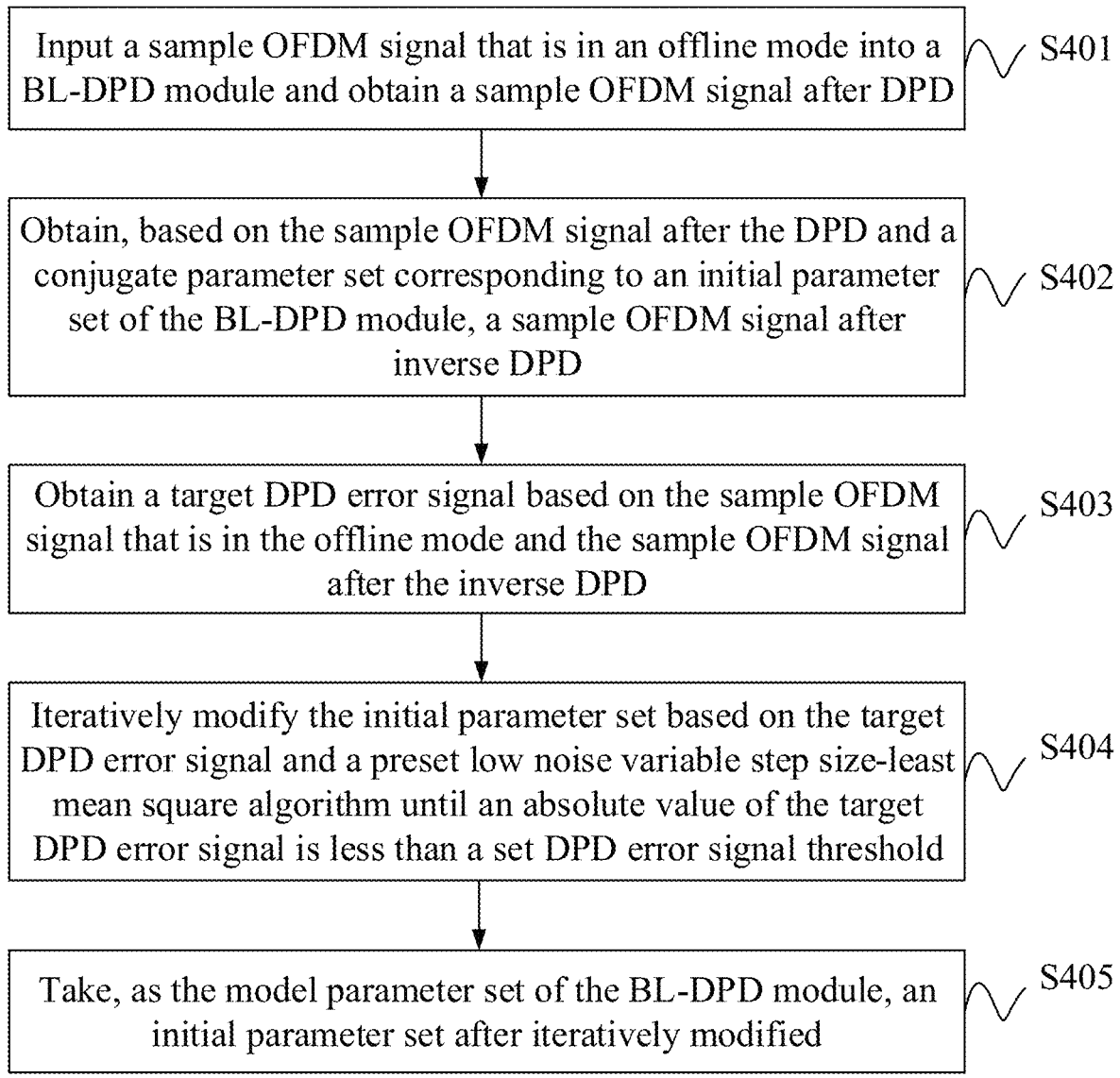
FIG. 4 is a schematic flowchart of a method for obtaining a model parameter set of a band limited-digital pre-distortion (BL-DPD) module according to an embodiment of the disclosure.

In an optional implementation, with reference to FIG. 4, under the condition that the parameter combination of the model parameter set includes the kernel coefficient, the nonlinear order, the memory depth, and the order of the low-order LPF of the BL-DPD module, the model parameter set is obtained by the following method.

S401: a sample OFDM signal that is in an offline mode is input into the BL-DPD module and a sample OFDM signal after DPD is obtained.

Illustratively, when S401 is executed, it is assumed that the sample OFDM signal that is in the offline mode is s(n), and is subjected to kernel processing by the BL-DPD module, and a sample OFDM signal x(n) after DPD is obtained.

S402: based on the sample OFDM signal after the DPD and a conjugate parameter set corresponding to an initial parameter set of the BL-DPD module, a sample OFDM signal after inverse DPD is obtained.

Figure 5:
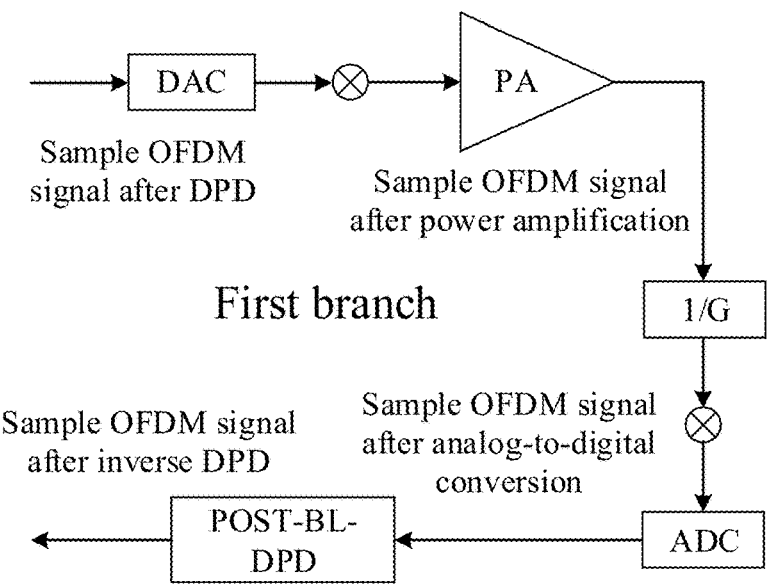
FIG. 5 is a schematic diagram of logic for obtaining a sample OFDM signal after inverse DPD according to an embodiment of the disclosure.

In an optional implementation, when S402 is executed, with reference to FIG. 5, after obtaining the sample OFDM signal after the DPD, the OFDM communication system may sequentially perform, through the first branch in an offline mode, digital-to-analog conversion, up conversion and power amplification on the sample OFDM signal after the DPD and obtain a sample OFDM signal after the power amplification. Then, power attenuation, down conversion and analog-to-digital conversion are sequentially performed on the sample OFDM signal after the power amplification and a sample OFDM signal after the analog-to-digital conversion is obtained. Finally, based on the sample OFDM signal after the analog-to-digital conversion and the conjugate parameter set corresponding to the initial parameter set, the sample OFDM signal after the inverse DPD is obtained.

Illustratively, firstly, the sample OFDM signal x(n) after DPD is subjected to DAC and up conversion to a working frequency band of the PA, then the sample OFDM signal after the frequency conversion is sent into the PA, and part of the sample OFDM signal after the power amplification is coupled back to a feedback channel. Then, on a feedback channel of the first branch, the sample OFDM signal after power amplification first passes through one attenuator 1/G, and power of the signal is attenuated. Then, a feedback signal vector (i.e., the sample OFDM signal after the analog-to-digital conversion) v(n) is obtained through down conversion and ADC sampling. Finally, the feedback signal vector v(n) is processed by the training network POST-BL-DPD model to obtain the sample OFDM signal ẑ(n) after inverse DPD.

Optionally, a computation formula of the sample OFDM signal ẑ(n) after inverse DPD is specifically as follows:

$$\hat{z}(n) = w_0^H \cdot v(n).$$

Where $w_0^H$ denotes transposition of a (complex) conjugate parameter set corresponding to the initial parameter set $w_0$ of the BL-DPD module. It should be noted that before S401 is executed, the model parameter set of the training network POST-BL-DPD model needs to be initialized as the initial parameter set $w_0$.

S403: a target DPD error signal is obtained based on the sample OFDM signal that is in the offline mode and the sample OFDM signal after the inverse DPD.

Optionally, when S403 is executed, a computation formula of the target DPD error signal is specifically as follows:

$$e_{BL-DPD}(n) = x(n) - \hat{z}(n).$$

Where $e_{BL-DPD}(n)$ denotes a target DPD error signal, x(n) denotes a sample OFDM signal, and ẑ(n) denotes a sample OFDM signal after inverse DPD.

S404: the initial parameter set is iteratively modified based on the target DPD error signal and a preset low noise variable step size-least mean square algorithm until an absolute value of the target DPD error signal is less than a set DPD error signal threshold.

Illustratively, an absolute value of the above target DPD error signal is expressed as $|e_{BL-DPD}(n)|$, if the set DPD error signal threshold is $e_0$, the initial parameter set $w_0$ will not be iteratively modified based on the target DPD error signal and the preset LNVSS-LMS (adaptive) algorithm when $|e_{BL-DPD}(n)| < e_0$ is determined. The DPD error signal threshold $e_0$ is a convergence error determination threshold, and may equal 0.001.

Figure 6:
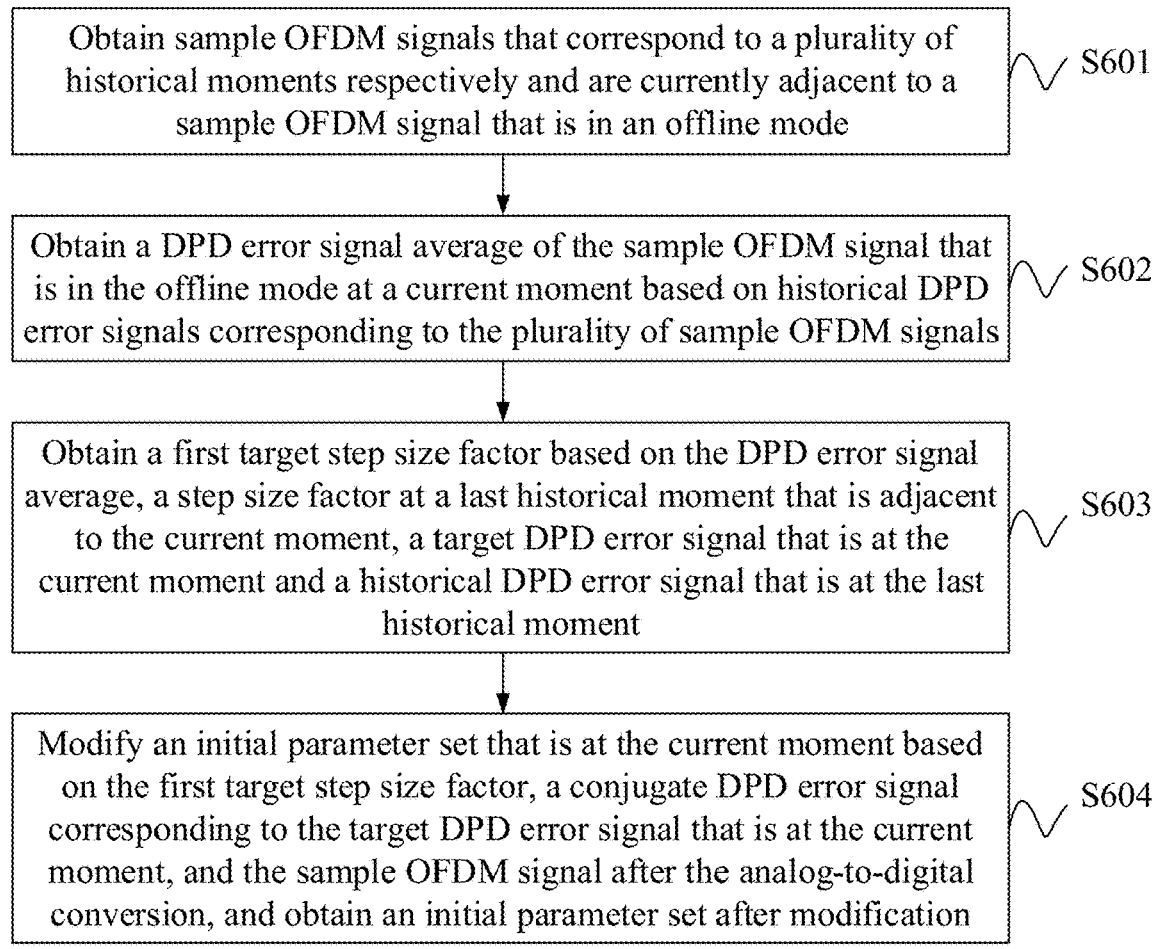
FIG. 6 is a schematic flowchart of implementing a method for modifying an initial parameter set in an offline mode according to an embodiment of the disclosure.

In an optional implementation, when S405 is executed with reference to FIG. 6, the OFDM communication system executes operations during each modification of the initial parameter set $w_0$ as follows.

S601: sample OFDM signals that correspond to a plurality of historical moments respectively and are currently adjacent to the sample OFDM signal that is in the offline mode are obtained.

Illustratively, when S601 is executed, the OFDM communication system obtains sample OFDM signals s(i) that correspond to the plurality of historical moments respectively and are currently adjacent to the sample OFDM signal s(n) that is in an offline mode, for example, first N sample OFDM signals s(i) are obtained, i is an integer ∈ (1, N).

S602: a DPD error signal average of the sample OFDM signal that is in the offline mode at a current moment is obtained based on historical DPD error signals corresponding to the plurality of sample OFDM signals.

Optionally, when S602 is executed, a computation formula of the DPD error signal average is specifically as follows:

$$\bar{e}_{BL-DPD}(n) = \frac{\sum_{1}^{N} e_{BL-DPD}(i)}{N}.$$

Where $\bar{e}_{BL-DPD}(n)$ denotes the DPD error signal average, and $e_{BL-DPD}(i)$ denotes a historical DPD error signal corresponding to a $i^{th}$ sample OFDM signal.

S603: a first target step size factor is obtained based on the DPD error signal average, a step size factor at a last historical moment that is adjacent to the current moment, a target DPD error signal that is at the current moment and a historical DPD error signal that is at the last historical moment.

Optionally, when S603 is executed, a computation formula of the first target step size factor is expressed as follows:

$$\mu(n+1) = \alpha\mu(n) + \beta \cdot abs(\bar{e}_{BL-DPD}(n)) \cdot abs(abs(e_{BL-DPD}(n)) - abs(e_{BL-DPD}(n-1))).$$

Where $\mu(n+1)$ denotes the first target step size factor, $\mu(n)$ denotes the step size factor at the last historical moment that is adjacent to the current moment, $\bar{e}_{BL-DPD}(n)$ denotes the DPD error signal average, $e_{BL-DPD}(n)$ denotes the target DPD error signal at the current moment, $e_{BL-DPD}(n-1)$ denotes the historical DPD error signal at the last historical moment, abs(*) denotes an absolute value operation; a denotes a forgetting factor of the step size, and α is smaller than and approximates to 1 since its value exceeding 1 will cause the LNVSS-LMS algorithm to fail in convergence and its value being too small will cause the step size to change too rapidly when the LNVSS-LMS algorithm converges, and result in a great steady-state error; and β determines a degree to which the step size factor is affected by the error, the error is small when the LNVSS-LMS algorithm converges, and in order to get a smaller μ value, the β has a very small value generally.

It should be noted that the above α and β are preset according to the actual situation. Further, the computation formula of the first target step size factor may also be regarded as an updated formula of the first target step size factor.

S604: an initial parameter set that is at the current moment is modified based on the first target step size factor, a conjugate DPD error signal corresponding to the target DPD error signal that is at the current moment, and the sample OFDM signal after the analog-to-digital conversion, and an initial parameter set after modification is obtained.

Optionally, when S604 is executed, a computation formula of the initial parameter set after the modification is as follows:

$$w_0(n+1) = w_0(n) + \mu(n+1)v(n)e^*_{BL-DPD}(n).$$

Where $w_0(n+1)$ denotes the initial parameter set after the modification, $w_0(n)$ denotes the initial parameter set that is at the current moment, $\mu(n+1)$ denotes the first target step size factor, v(n) denotes the sample OFDM signal after the analog-to-digital conversion, and $e^*_{BL-DPD}(n)$ denotes a (complex) conjugate DPD error signal corresponding to the target DPD error signal $e_{BL\text{-}DPD}(n)$ that is at the current moment.

Apparently, based on the method described in the above S601-S604, the initial parameter set is iteratively modified in the offline mode, such that the BL-DPD module can compensate for nonlinear distortion of the initial OFDM signal according to a more accurate model parameter set.

S405: an initial parameter set after iteratively modified is taken as the model parameter set of the BL-DPD module.

Specifically, when S405 is executed, under the condition determining that the absolute value of the current target DPD error signal is less than the set DPD error signal threshold, the initial parameter set after iteratively modified at this time may be taken as the model parameter set of the BL-DPD module, and the model parameter set may be assigned to the BL-DPD module.

Optionally, before S404 is executed, the initial parameter set is directly taken as the model parameter set of the BL-DPD module under the condition that the absolute value of the target DPD error signal is not less than the DPD error signal threshold.

As a result, based on the method described in the above S401-S405, an offline mode is selected as Mode in the OFDM communication system, the sample OFDM signal is processed by the nonlinear compensation fusion model and the first branch, and the POST-BL-DPD module is trained by the LNVSS-LMS adaptive algorithm, such that the model parameter set of the BL-DPD module is modified and extracted.

Figure 7:
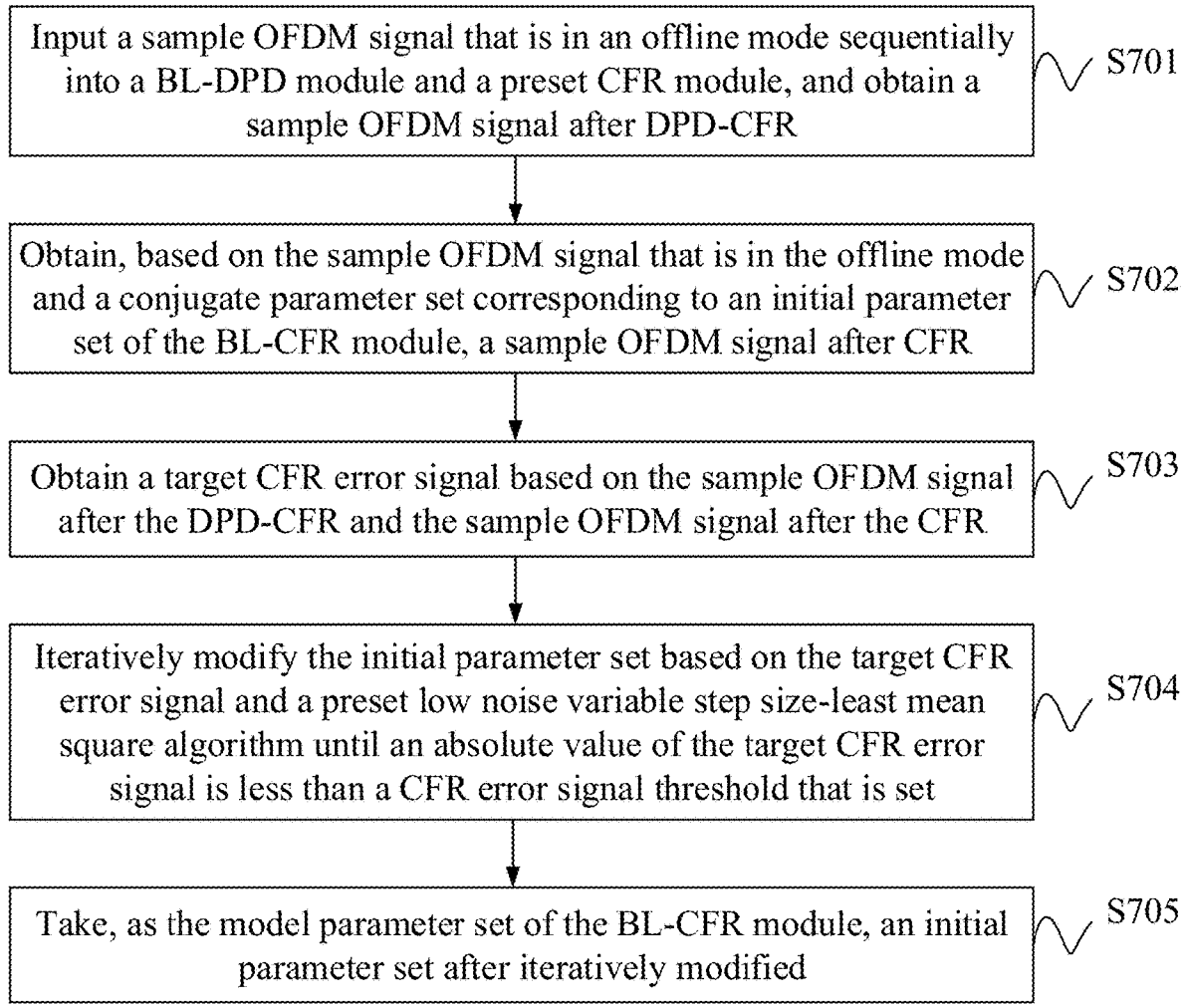
FIG. 7 is a schematic flowchart of a method for obtaining a model parameter set of a band limited-crest factor reduction (BL-CFR) module according to an embodiment of the disclosure.

In an optional implementation, with reference to FIG. 7, under the condition that the parameter combination of the model parameter set includes the kernel coefficient, the nonlinear order, the memory depth, and the order of the low-order LPF of the BL-CFR module, the model parameter set is obtained by the following method.

S701: a sample OFDM signal that is in an offline mode is sequentially input into the BL-DPD module and a preset CFR module, and a sample OFDM signal after DPD-CFR is obtained.

Illustratively, when S701 is executed, it is assumed that the sample OFDM signal that is in the offline mode is s(n), and is subjected to kernel processing by the BL-DPD module, and a sample OFDM signal x(n) after DPD is obtained. The sample OFDM signal x(n) after DPD is processed by the preset CFR module, and the sample OFDM signal $x_c(n)$ after DPD-CFR is obtained.

S702: based on the sample OFDM signal that is in the offline mode and a conjugate parameter set corresponding to an initial parameter set of the BL-CFR module, a sample OFDM signal after CFR is obtained.

Optionally, when S702 is executed, a computation formula of the sample OFDM signal u(n) after CFR is specifically as follows:

$$u(n) = w_1^H \cdot s(n).$$

Where $w_1^H$ denotes transposition of a (complex) conjugate parameter set corresponding to the initial parameter set $w_1$ of the BL-CFR module. It should be noted that before S701 is executed, the model parameter set of the training network POST-BL-CFR model needs to be initialized as the initial parameter set $w_1$.

It should be noted that when the BL-CFR model is trained, improved CFR technology is used. When an amplitude of an input signal (i.e., the sample OFDM signal x(n) after DPD) is greater than a threshold P, the amplitude is assigned as the threshold amplitude, and a phase keeps unchanged as an original signal phase. As a result, a computation formula of the sample OFDM signal $x_c(n)$ after DPD-CFR is as follows:

$$x_c(n) = \begin{cases} \text{abs}(x(n))\exp(j\theta) & \text{abs}(x(n)) \le P \\ P \cdot \exp(j\theta) & \text{abs}(x(n)) > P \end{cases}.$$

Where abs(*) denotes an absolute value operation, and exp(*) denotes an exponential function.

S703: a target CFR error signal is obtained based on the sample OFDM signal after the DPD-CFR and the sample OFDM signal after the CFR.

Optionally, when S703 is executed, a computation formula of the target CFR error signal is specifically as follows:

$$e_{BL\text{-}CFR}(n)=u(n)-x_c(n).$$

Where $e_{BL\text{-}CFR}(n)$ denotes a target CFR error signal, u(n) denotes a sample OFDM signal after CFR, and $x_c(n)$ denotes a sample OFDM signal after DPD-CFR.

S704: the initial parameter set is iteratively modified based on the target CFR error signal and a preset low noise variable step size-least mean square algorithm until an absolute value of the target CFR error signal is less than a CFR error signal threshold that is set.

Illustratively, an absolute value of the above target CFR error signal is expressed as $|e_{BL\text{-}CFR}(n)|$, if the CFR error signal threshold that is set is $e_1$, the initial parameter set $w_1$ will not be iteratively modified based on the target DPD error signal and the preset LNVSS-LMS (adaptive) algorithm when $|e_{BL\text{-}CFR}(n)|<e_1$ is determined. The CFR error signal threshold $e_1$ is a convergence error determination threshold, and may equal 0.001.

It should be noted that a specific process of modifying the initial parameter set $w_1$ every time by the OFDM communication system is consistent with a process of modifying the initial parameter set $w_0$ every time described in the above steps S601-S604, which will not be repeated any more in the embodiment of the disclosure.

S705: an initial parameter set after iteratively modified is taken as the model parameter set of the BL-CFR module.

Specifically, when S705 is executed, under the condition determining that the absolute value of the current target CFR error signal is less than the CFR error signal threshold that is set, the initial parameter set after iteratively modified at this time may be taken as the model parameter set of the BL-CFR module, and the model parameter set may be assigned to the BL-CFR module.

Optionally, before step 704 is executed, the initial parameter set is directly taken as the model parameter set of the BL-CFR module under the condition that the absolute value of the target CFR error signal is not less than the CFR error signal threshold.

As a result, based on the method described in the above steps S701-S705, an offline mode is selected as Mode in the OFDM communication system, the sample OFDM signal is processed by the nonlinear compensation fusion model and the second branch, and the POST-BL-CFR module is trained by the LNVSS-LMS adaptive algorithm, such that the model parameter set of the BL-CFR module is modified and extracted.

Figure 8:
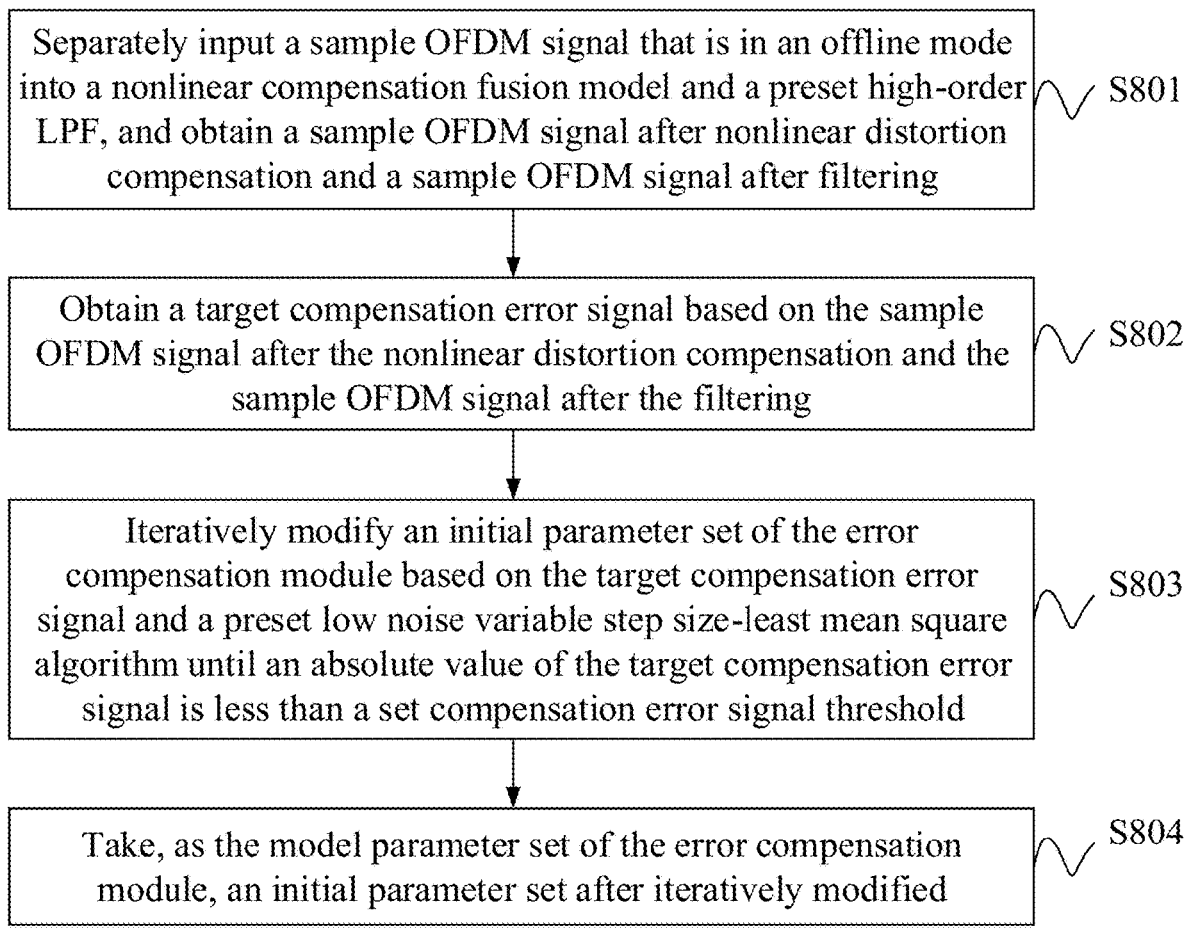
FIG. 8 is a schematic flowchart of a method for obtaining a model parameter set of an error compensation module according to an embodiment of the disclosure.

In an optional implementation, with reference to FIG. 8, under the condition that the parameter combination of the model parameter set includes the kernel coefficient, the nonlinear order and the memory depth of the error compensation module (ECM), the model parameter set is obtained by the following method.

S801: a sample OFDM signal after nonlinear distortion compensation and a sample OFDM signal after filtering by inputting a sample OFDM signal that is in an offline mode into the nonlinear compensation fusion model and a preset high-order LPF respectively are obtained.

It should be noted that when the model parameter set of the error compensation module (ECM) is obtained, that is, when the methods described in steps S801-S804 are executed, the sample OFDM signal that is in the offline mode is small, that is, an amplitude is small, and the signal is in a linear region of the PA.

Further, in order to reduce the model complexity, the BL-DPD module and the BL-CFRM module are generated through processing by the low-order FIR. In order to compensate for a signal loss caused by low-order FIR, a high-order FIR is used to train an error compensation parameter in the offline mode. In this way, an order of the band-limited FIR is effectively reduced, the complexity of the entire nonlinear distortion fusion model is reduced, and precision and performance of the entire model can be guaranteed at the same time.

Optionally, when S801 is executed, it is assumed that the sample OFDM signal that is in the offline mode is s(n), and a computation formula of the sample OFDM signal z(n) after nonlinear distortion compensation is specifically as follows:

$$z(n) = w_0^H \cdot s(n) + w_1^H \cdot s(n) + w_2^H \cdot s(n).$$

Where $w_0^H$ denotes transposition of a (complex) conjugate parameter set corresponding to the initial parameter set $w_0$ of the BL-DPD module, $w_1^H$ denotes transposition of a (complex) conjugate parameter set corresponding to the initial parameter set $w_1$ of the BL-CFR module and $w_2^H$ denotes transposition of a (complex) conjugate parameter set corresponding to the initial parameter set $w_2$ of the error compensation module (ECM). It should be noted that before S801 is executed, the model parameter set of the error compensation module (ECM) needs to be initialized as the initial parameter set $w_2$.

A computation formula of the sample OFDM signal $s_L(n)$ after filtering is specifically as follows:

$$s_L(n) = \sum_{l'=0}^{L'} h \cdot s(n - l').$$

Where h denotes a coefficient of the preset high-order LPF and L' denotes an order of the preset high-order LPF. Optionally, the order L' is not less than 91.

S802: a target compensation error signal is obtained based on the sample OFDM signal after the nonlinear distortion compensation and the sample OFDM signal after the filtering.

Optionally, when S802 is executed, a computation formula of the target compensation error signal is specifically as follows:

$$e_{ECM}(n) = z(n) - s_L(n).$$

Where $e_{ECM}(n)$ denotes the target compensation error signal, z(n) denotes the sample OFDM signal after the nonlinear distortion compensation, and $s_L(n)$ denotes a sample OFDM signal after filtering.

S803: an initial parameter set of the error compensation module is iteratively modified based on the target compensation error signal and a preset low noise variable step size-least mean square algorithm until an absolute value of the target compensation error signal is less than a set compensation error signal threshold.

Illustratively, an absolute value of the above target compensation error signal is expressed as $|e_{ECM}(n)|$, if the set compensation error signal threshold is $e_2$, the initial parameter set $w_2$ will not be iteratively modified based on the target compensation error signal and the preset LNVSS-LMS (adaptive) algorithm when $|e_{ECM}(n)| < e_2$ is determined. The compensation error signal threshold $e_2$ is a convergence error determination threshold, and may equal 0.001.

It should be noted that a specific process of modifying the initial parameter set $w_2$ every time by the OFDM communication system is consistent with a process of modifying the initial parameter set $w_0$ every time described in the above S601-S604, which will not be repeated any more in the embodiment of the disclosure.

S804: an initial parameter set after iteratively modified is taken as the model parameter set of the error compensation module.

Specifically, when S805 is executed, under the condition determining that the absolute value of the current target compensation error signal is less than the set compensation error signal threshold, the initial parameter set after iteratively modified at this time may be taken as the model parameter set of the error compensation module (ECM), and the model parameter set may be assigned to the error compensation module (ECM).

Optionally, before S804 is executed, and the initial parameter set is directly taken as the model parameter set of the error compensation module (ECM) under the condition that the absolute value of the target compensation error signal is not less than the compensation error signal threshold.

As a result, based on the method described in the above steps S801-S804, an offline mode is selected as Mode in the OFDM communication system, the sample OFDM signal is processed by the nonlinear compensation fusion model and the third branch, and the CBL-CFR-DPD module is trained by the LNVSS-LMS adaptive algorithm, such that the model parameter set of the error compensation module (ECM) is modified and extracted.

Figure 9:
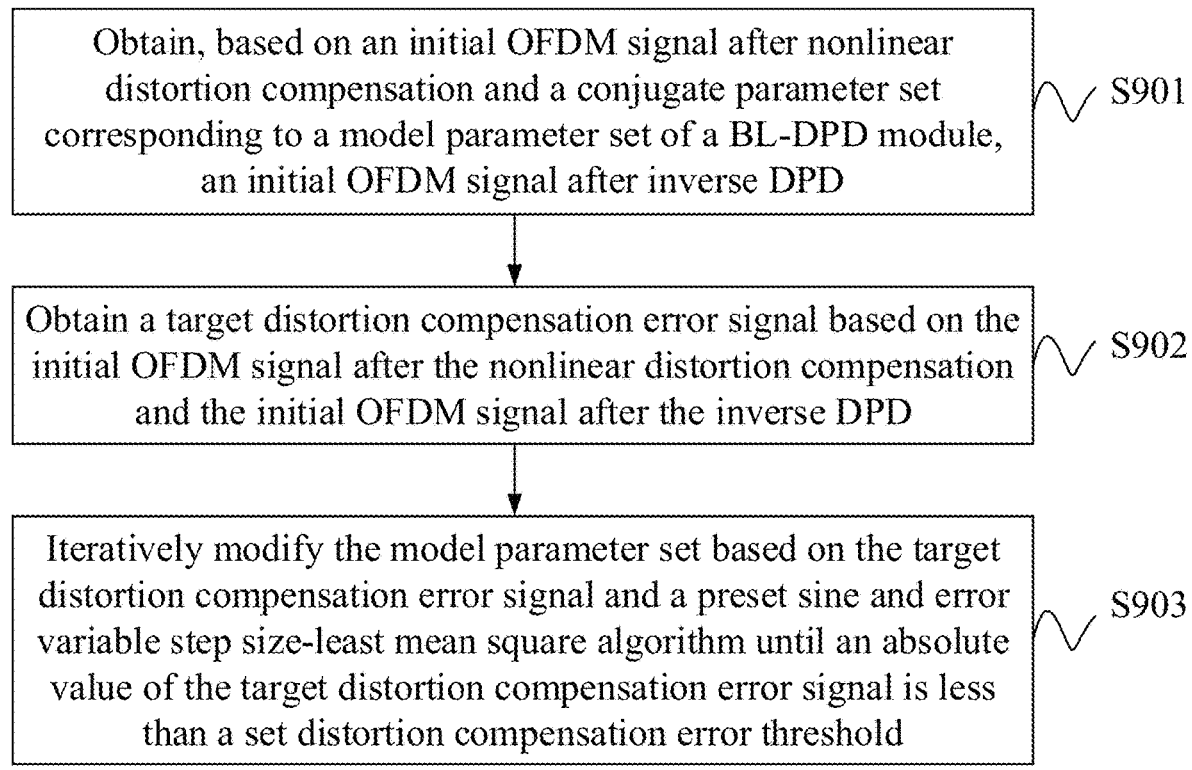
FIG. 9 is a schematic flowchart of implementing a method for modifying a model parameter set in an online mode according to an embodiment of the disclosure.

Further, with reference to FIG. 9, after the OFDM communication system obtains, through the nonlinear compensation fusion model, the initial OFDM signal after the nonlinear distortion compensation, and then may further refresh/modify the model parameter set of the BL-DPD module in a specific operation flow as follows:

S901: based on the initial OFDM signal after the nonlinear distortion compensation and a conjugate parameter set corresponding to a model parameter set of the BL-DPD module, an initial OFDM signal after inverse DPD is obtained.

Figure 10:
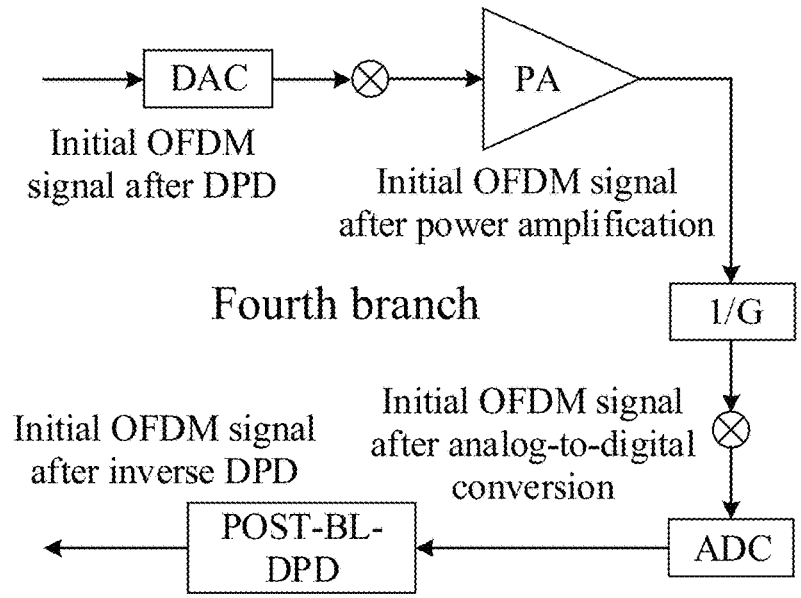
FIG. 10 is a schematic diagram of logic for obtaining an initial OFDM signal after inverse DPD according to an embodiment of the disclosure.

In an optional implementation, with reference to FIG. 10, after obtaining the initial OFDM signal after the nonlinear distortion compensation, the OFDM communication system may sequentially perform, through the fourth branch in an online mode, digital-to-analog conversion, up conversion and power amplification on the initial OFDM signal after the nonlinear distortion compensation and obtain an initial OFDM signal after the power amplification. Then, power attenuation, down conversion and analog-to-digital conversion are sequentially performed on the initial OFDM signal after the power amplification and an initial OFDM signal after the analog-to-digital conversion is obtained. Finally, based on the initial OFDM signal after the analog-to-digital conversion and the conjugate parameter set corresponding to the model parameter set, the initial OFDM signal after the inverse DPD is obtained.

Illustratively, it is assumed that the initial OFDM signal after the nonlinear distortion compensation is z'(n), the initial OFDM signal z'(n) after nonlinear distortion compensation is subjected to DAC and up conversion to a working frequency band of the PA, then the initial OFDM signal after the initial conversion is sent into the PA, and part of the initial OFDM signal after power amplification is coupled back to a feedback channel. Then, on a feedback channel of the fourth branch, the initial OFDM signal after power amplification first passes through one attenuator 1/G, and power of the signal is attenuated. Then, a feedback signal vector (i.e., the initial OFDM signal after analog-to-digital conversion) v'(n) is obtained through down conversion and ADC sampling. Finally, the feedback signal vector v'(n) is processed by the training network POST-BL-DPD model to obtain the initial OFDM signal $\hat{z}'(n)$ after inverse DPD.

Optionally, a computation formula of the initial OFDM signal $\hat{z}'(n)$ after the inverse DPD is specifically as follows:

$$\hat{z}'(n) = w_0^H \cdot v'(n).$$

Where $w_0^H$ denotes transposition of a (complex) conjugate parameter set corresponding to a model parameter set $w_0$ when the BL-DPD module converges in an offline mode. It should be noted that before S901 is executed, the model parameter set of the training network POST-BL-DPD model needs to be initialized as the model parameter set $w_0$ that is during convergence in an offline mode.

S902: a target distortion compensation error signal is obtained based on the initial OFDM signal after the nonlinear distortion compensation and the initial OFDM signal after the inverse DPD.

Optionally, when S902 is executed, a computation formula of the target distortion compensation error signal is as follows:

$$e_{CBL-CFR-DPD}(n) = z'(n) - \hat{z}'(n).$$

Where $e_{CBL-CFR-DPD}(n)$ denotes the target distortion compensation error signal, z'(n) denotes the initial OFDM signal after the nonlinear distortion compensation, and $\hat{z}'(n)$ denotes an initial OFDM signal after inverse DPD.

S903: the model parameter set is iteratively modified based on the target distortion compensation error signal and a preset sine and error variable step size-least mean square algorithm until an absolute value of the target distortion compensation error signal is less than a set distortion compensation error threshold.

Illustratively, an absolute value of the above target distortion compensation error signal is expressed as $|e_{CBL-CFR-DPD}(n)|$, if the set distortion compensation error signal threshold is $e_3$, the model parameter set $w_0$ that is during convergence in an offline mode will not be iteratively modified based on the target distortion compensation error signal and the preset SEVSS-LMS (adaptive) algorithm when $|e_{CBL-CFR-DPD}(n)| < e_3$ is determined. The distortion compensation error signal threshold is $e_3$, that is, an error determination threshold is refreshed, and may equal 0.01.

It can be seen that based on the above manner, it is unnecessary to consider the convergence time and complexity in the offline mode, an adaptive identification algorithm with desirable performance is required, that is, the LNVSS-LMS adaptive algorithm, and small threshold convergence thresholds (i.e., $e_0$, $e_1$ and $e_2$) are set for extracting the parameters of the BL-DPD module, the BL-CFRM module and the ECM module (i.e., the respective model parameter sets of the modules), such that model accuracy is improved. In the online mode, the convergence time and complexity need to be considered, the parameters need to be converged in a small range in the online mode since the parameters are converged in the offline mode, the SEVSS-LMS adaptive algorithm is used to effectively refresh the model parameters of the CBL-CFR-DPD (i.e., the model parameter set of the BL-DPD module) by setting a large threshold convergence threshold (i.e., $e_3$), and quick convergence can be implemented.

In addition, a novel integrated solution of CBL-CFR-DPD is built. The parameters of the modules are extracted and updated by an "offline+online" mechanism. In other words, the parameters of the modules are extracted in the offline mode, such that work efficiency is effectively improved. The parameters of the CBL-CFR-DPD module are refreshed effectively in the online mode, such that a broadband signal can be predistorted quickly, and compensation by a digital predistorter for nonlinear performance of a broadband PA can be effectively improved in engineering. In addition, the BL-DPD module and the BL-CFRM module are truly integrated into one module through the error compensation module (ECM). As a result, the model has operational complexity equivalent to that of a system that merely implements DPD, except for addition and subtraction operations of some coefficients, and is reduced in operational complexity compared with a typical solution of independent application of the CFR module and the DPD module.

Figure 11:
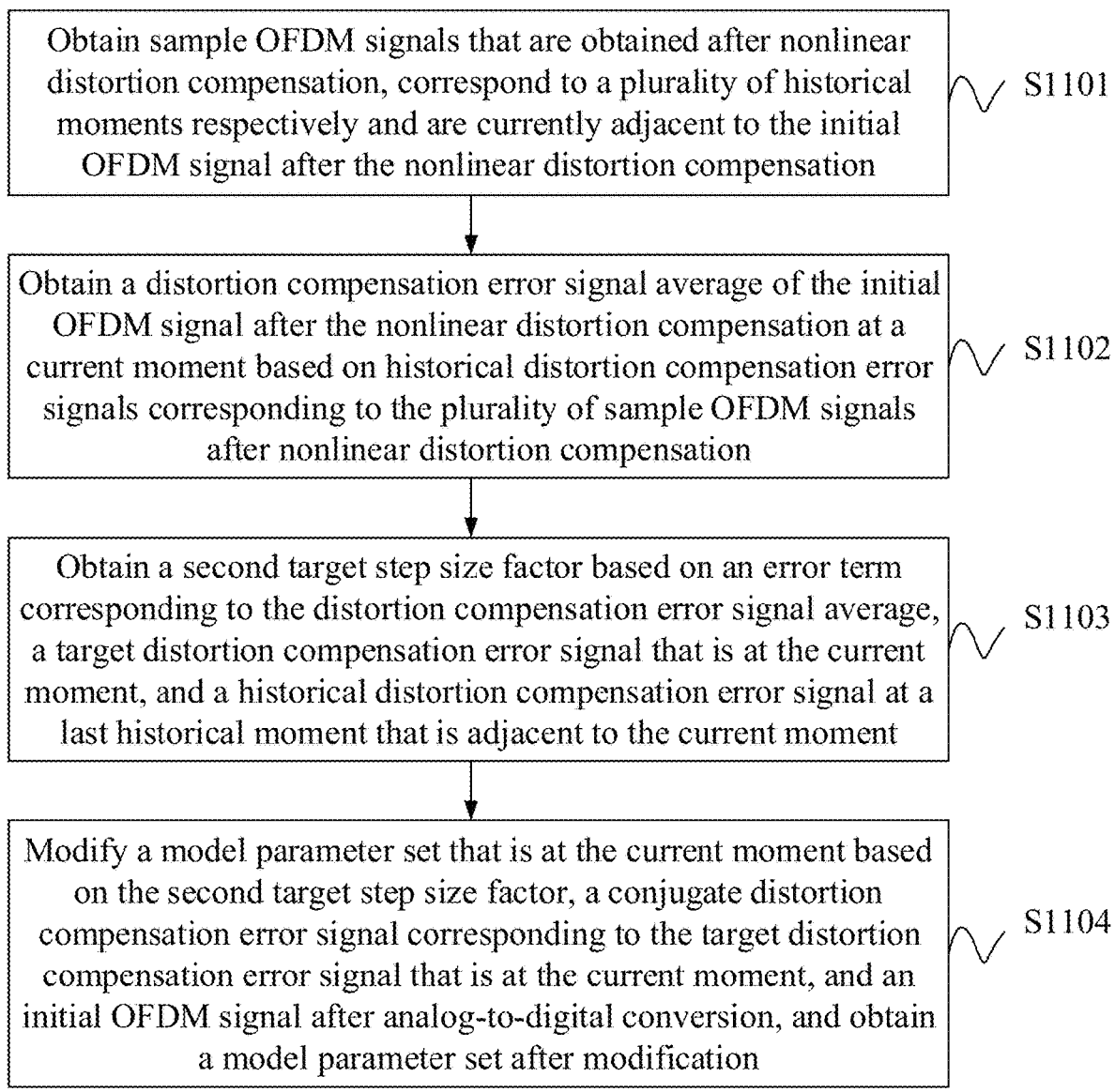
FIG. 11 is a schematic flowchart of specific implementation based on FIG. 9 according to an embodiment of the disclosure.

In an optional implementation, when S903 is executed with reference to FIG. 11, the OFDM communication system executes operations during each modification of the model parameter set $w_0$ that is during convergence in an offline mode as follows.

S1101: sample OFDM signals that are obtained after nonlinear distortion compensation, correspond to a plurality of historical moments respectively and are currently adjacent to the initial OFDM signal after the nonlinear distortion compensation are obtained.

Illustratively, when S1101 is executed, the OFDM communication system obtains sample OFDM signals z'(i) that are obtained after nonlinear distortion compensation, correspond to the plurality of historical moments respectively and are currently adjacent to the initial OFDM signal z'(n) after nonlinear distortion compensation, for example, first N sample OFDM signals z'(i) after nonlinear distortion compensation are obtained, i is an integer ∈ (1, N).

S1102: a distortion compensation error signal average of the initial OFDM signal after the nonlinear distortion compensation at a current moment based on historical distortion compensation error signals corresponding to the plurality of sample OFDM signals after the nonlinear distortion compensation is obtained.

Optionally, when S1102 is executed, a computation formula of the distortion compensation error signal average is specifically as follows:

$$\bar{e}_{CBL-CFR-DPD}(n) = \frac{\sum_1^N e_{CBL-CFR-DPD}(i)}{N}.$$

Where $\bar{e}_{CBL\text{-}CFR\text{-}DPD}(n)$ denotes the distortion compensation error signal average, and $e_{CBL\text{-}CFR\text{-}DPD}(i)$ denotes a historical distortion compensation error signal corresponding to a $i^{th}$ sample OFDM signal.

S1103: a second target step size factor is obtained based on an error term corresponding to the distortion compensation error signal average, a target distortion compensation error signal that is at the current moment, and a historical distortion compensation error signal at a last historical moment that is adjacent to the current moment.

Optionally, when S1103 is executed, a computation formula of the second target step size factor is expressed as follows:

$$\mu(n) = \alpha \, \sin(b \cdot |e_{CBL\text{-}CFR\text{-}DPD}(n)| \cdot |e_{CBL\text{-}CFR\text{-}DPD}(n-1)| \cdot \text{erf}(1 - e^{-c|\bar{e}_{CBL\text{-}CFR\text{-}DPD}(n)|})).$$

Where $\mu(n)$ denotes the second target step size factor, $e_{CBL\text{-}CFR\text{-}DPD}(n)$ denotes the target distortion compensation error signal that is at the current moment, $e_{CBL\text{-}CFR\text{-}DPD}(n-1)$ denotes the historical distortion compensation error signal at a last historical moment that is adjacent to the current moment, $\text{erf}(1-e^{-c|\bar{e}_{CBL\text{-}CFR\text{-}DPD}(n)|})$ denotes an error term corresponding to the distortion compensation error signal average, $\text{erf}(*)$ denotes an error function, and a, b and c denote adjustment factors, and are preset according to the actual situation. Further, the computation formula of the second target step size factor may also be regarded as an updated formula of the second target step size factor.

S1104: a model parameter set that is at the current moment is modified based on the second target step size factor, a conjugate distortion compensation error signal corresponding to the target distortion compensation error signal that is at the current moment, and an initial OFDM signal after analog-to-digital conversion, and a model parameter set after modification is obtained.

Optionally, when S1104 is executed, a computation formula of the model parameter set after modification is as follows:

$$w_0(n+1) = w_0(n) + \mu(n) v'(n) e^*_{CBL\text{-}CFR\text{-}DPD}(n).$$

Where $w_0(n+1)$ denotes the model parameter set after the modification, $w_0(n)$ denotes the model parameter set that is at the current moment, $\mu(n)$ denotes the second target step size factor, $v'(n)$ denotes the initial OFDM signal after the analog-to-digital conversion, and $e^*_{CBL\text{-}CFR\text{-}DPD}(n)$ denotes a (complex) conjugate distortion compensation error signal corresponding to the target distortion compensation error signal $e_{CBL\text{-}CFR\text{-}DPD}(n)$ that is at the current moment.

Apparently, based on the method described in the above steps S1101-S1104, the model parameter set of the BL-DPD module is iteratively modified in the online mode, such that the BL-DPD module can compensate for nonlinear distortion of the subsequent OFDM signal according to a more accurate model parameter set.

Optionally, in the online mode, the OFDM communication system may iteratively modify the model parameter set of the BL-DPD module according to the set cycle time, that is, the initial OFDM signal may be processed by the branch (i.e., the nonlinear compensation fusion model and the fourth branch) in the online mode according to the preset cycle T.

Further, under the condition determining that the absolute value of the current target distortion compensation error signal is less than the set distortion compensation error threshold, the model parameter set that is iteratively modified at this time may be taken as the new model parameter set of the BL-DPD module, and the model parameter set may be assigned to the BL-DPD module.

As a result, based on the method described in the above S901-S903, the Mode in the OFDM communication system is switched to an online mode. The initial OFDM signal is processed by the branch (the nonlinear compensation fusion model and the fourth branch) in the online mode according to the preset cycle T. The SEVSS-LMS adaptive algorithm is used, such that the parameter (i.e., the model parameter set of the BL-DPD module) of the nonlinear compensation fusion model (i.e., the CBL-CFR-DPD model) can be effectively refreshed/modified.

To sum up, in the method for compensating for nonlinear distortion of a signal according to the embodiment of the disclosure, the preset nonlinear compensation fusion model is configured to perform DPD, CFR and error compensation on the initial OFDM signal separately, and obtain the initial OFDM signal after the nonlinear distortion compensation based on the first OFDM signal, the second OFDM signal and the third OFDM signal after the initial OFDM signal is performed by the BL-DPD module, the BL-CFR module and the error compensation module respectively.

In this way, through a parallel connection of the BL-DPD module, the BL-CFR module and the error compensation module that are in the preset nonlinear compensation fusion model, the technical disadvantages that in the prior art, a DPD module is applied after a CFR module, a higher sampling rate of the ADC/DAC in the OFDM system is required, the requirements for hardware and algorithm convergence speed are increased, and difficulty and cost of system implementation are increased are avoided. As a result, the requirement for the sampling rate of the ADC/DAC is effectively reduced, compensation performance of the DPD for nonlinearity of the power amplifier is further improved, and communication performance and perception performance of the OFDM system are further improved.

Based on the same inventive concept, the embodiment of the disclosure further provides a nonlinear compensation fusion model. The nonlinear compensation fusion model includes a BL-DPD module, a BL-CFR module and an error compensation module; where the BL-DPD module, the BL-CFR module and the error compensation module are connected in parallel, the BL-DPD module and the BL-CFR module adopt the same basis function and the error compensation module is configured to perform error compensation on OFDM signals that are output by the BL-DPD module and the BL-CFR module.

In an optional embodiment, a basis function adopted by the BL-DPD module and a basis function adopted by the BL-CFR module are the same.

In an optional embodiment, the nonlinear compensation fusion model is configured to: obtain a first OFDM signal, a second OFDM signal and a third OFDM signal after an initial OFDM signal is processed by the BL-DPD module, the BL-CFR module and the error compensation module respectively; and obtain, based on the first OFDM signal, the second OFDM signal and the third OFDM signal, an initial OFDM signal after nonlinear distortion compensation.

In an optional embodiment, the nonlinear compensation fusion model is further configured to: extract, in an offline mode, a model parameter set from the BL-DPD module, the BL-CFR module and the error compensation module by using a preset low noise variable step size-least mean square algorithm.

In an optional embodiment, the nonlinear compensation fusion model is further configured to: refresh, in an online mode, a model parameter set of the nonlinear compensation fusion model by using a preset sine and error variable step size-least mean square algorithm and based on preset cycle time.

In an optional embodiment, the nonlinear compensation fusion model is specifically configured to: refresh, in an online mode, a model parameter set of the BL-DPD module in the nonlinear compensation fusion model merely by using the preset sine and error variable step size-least mean square algorithm and based on the preset cycle time.

Based on the same inventive concept, the embodiment of the disclosure further provides an OFDM communication system. The OFDM communication system includes the nonlinear compensation fusion model, a first branch, a second branch, a third branch and a fourth branch.

A BL-DPD module in the nonlinear compensation fusion model and the first branch are configured to iteratively modify an initial parameter set of the BL-DPD module in an offline mode and obtain a model parameter set of the BL-DPD module.

A BL-CFR module in the nonlinear compensation fusion model and the second branch are configured to iteratively modify an initial parameter set of the BL-CFR module in an offline mode and obtain a model parameter set of the BL-CFR module.

The nonlinear compensation fusion model and the third branch are configured to iteratively modify an initial parameter set of an error compensation module in an offline mode and obtain a model parameter set of the error compensation module.

The nonlinear compensation fusion model and the fourth branch are configured to iteratively modify the model parameter set of the BL-DPD module in an online mode.

In an optional embodiment, the first branch includes a digital to analog converter (DAC), an up-converter, a power amplifier (PA), an attenuator, a band pass filter (BPF), a down-converter, an analog to digital converter (ADC), a training network POST-BL-DPD module and a preset low noise variable step size-least mean square algorithm module that are sequentially arranged.

In an optional embodiment, the second branch includes a CFR module, a training network POST-BL-DPD module and a preset low noise variable step size-least mean square algorithm module that are sequentially arranged.

In an optional embodiment, the third branch includes a low pass filter (LPF) and a preset low noise variable step size-least mean square algorithm module that are sequentially arranged.

In an optional embodiment, the fourth branch includes the DAC, the up-converter, the PA, the attenuator, the BPF, the down-converter, the ADC, the training network POST-BL-DPD module and a preset sine and error variable step size-least mean square algorithm module that are sequentially arranged.

Figure 12:
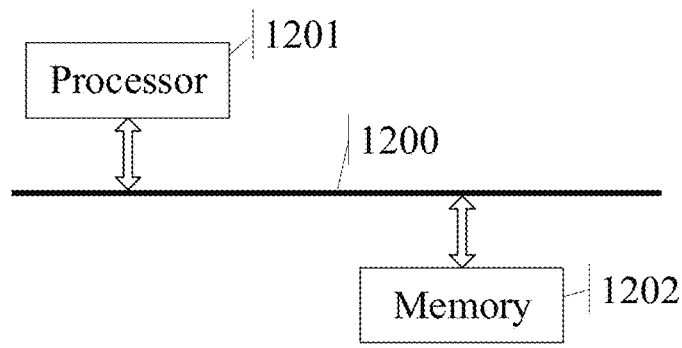
FIG. 12 is a schematic structural diagram of an electronic device according to an embodiment of the disclosure.

Based on the same technical concept, the embodiment of the disclosure further provides an electronic device. The electronic device may implement the method for compensating for nonlinear distortion of a signal according to the above embodiment of the disclosure. In an embodiment, the electronic device may be a server, a terminal device or other electronic devices. With reference to FIG. 12, the electronic device may include: at least one processor 1201, and a memory 1202 connected to the at least one processor 1201. The specific connection medium between the processor 1201 and the memory 1202 is not limited in the embodiment of the disclosure. In FIG. 12, the connection between the processor 1201 and the memory 1202 through a bus 1200 is taken as an example. The bus 1200 is expressed in a thick line in FIG. 12, and connection manners between other components are merely for illustrative illustration and are not limited. The bus 1200 may be divided into an address bus, a data bus, a control bus, etc. For the convenience of showing, only one thick line is used in FIG. 12 for showing the bus, which does not mean that there is merely one bus or one type of buses. Alternatively, the processor 1201 may also be referred to as a controller, and is not limited in name.

In the embodiment of the disclosure, the memory 1202 stores instructions that may be executed by the at least one processor 1201, and the at least one processor 1201 may execute the method for compensating for nonlinear distortion of a signal discussed above by executing the instructions stored in the memory 1202. The processor 1201 may implement functions of each module in the corresponding apparatus.

The processor 1201 acts as a control center of the apparatus, may connect all parts of the entire control device by using various interfaces and lines, and monitor the device as a whole by running or executing instructions stored in the memory 1202 and calling data (various function and processing data of the apparatus) stored in the memory 1202.

In a possible design, the processor 1201 may include one or more processing units, and the processor 1201 may integrate an application processor and a modem processor. The application processor mainly handles an operating system, a user interface, an application program, etc., and the modem processor mainly handles wireless communication. It can be understood that the above modem processor may not be integrated into the processor 1201. The processor 1201 and the memory 1202 may be implemented on the same chip in some embodiments, or may be implemented separately on independent chips in some other embodiments.

The processor 1201 may be a general-purpose processor (for example, a CPU), a digital signal processor, an application specific integrated circuit, a field programmable gate array or another programmable logic device, a discrete gate or a transistor logic device, or a discrete hardware component, and may implement or execute methods, steps and logic block diagrams according to the embodiments of the disclosure. The general-purpose processor may be a microprocessor, any conventional processor, etc. The steps of the method for compensating for nonlinear distortion of a signal disclosed in conjunction with the embodiments of the disclosure may be directly embodied to be executed and completed by a hardware processor, or may be executed and completed through a combination of hardware and software modules in the processor.

As a nonvolatile computer-readable storage medium, the memory 1202 may be used to store nonvolatile software programs, nonvolatile computer-executable programs and modules. The memory 1202 may include at least one type of storage medium, such as a flash memory, a hard disk, a multimedia card, a card memory, a random access memory (RAM), a static random access memory (SRAM), a programmable read only memory (PROM), a read only memory (ROM), an electrically erasable programmable read-only memory (EEPROM), a magnetic memory, a magnetic disk, an optical disk, etc. The memory 1202 is any other medium that may be used to carry or store desired program codes in the form of instructions or data structures and may be accessed by a computer, but is not limited thereto. The memory 1202 in the embodiment of the disclosure may also be a circuit or any other apparatus that may implement a storage function, and is used for storing program instructions and/or data.

By programming the processor 1201, codes corresponding to the method for compensating for nonlinear distortion of a signal introduced in the previous embodiment may be written to a chip, such that the chip may execute steps of the method for compensating for nonlinear distortion of a signal in the embodiment shown in FIG. 2 during operation. Designing and programing the processor 1201 are well known to those skilled in the art, and will not be repeated herein.

Based on the same inventive concept, the embodiment of the disclosure further provides a storage medium. The storage medium stores computer instructions. When the computer instructions are run on a computer, the computer is caused to execute the method for compensating for nonlinear distortion of a signal discussed above.

In some optional implementations, the disclosure further provides that various aspects of the method for compensating for nonlinear distortion of a signal may also be implemented in the form of a program product, which includes program codes. When the program product runs on an apparatus, the program codes are used to cause the control device to execute steps in the method for compensating for nonlinear distortion of a signal according to various illustrative implementations of the disclosure described above in the description.

It should be noted that although several units or sub-units of the apparatus are mentioned in the above detailed description, this division is merely illustrative and not mandatory. Actually, according to the implementation of the disclosure, features and functions of two or more units described above may be embodied in one unit. On the contrary, the features and functions of one unit described above may be further divided into a plurality of units to be embodied.

Further, although the operations of the method of the disclosure are described in a specific order in the accompanying drawings, this does not require or imply that these operations should be executed in this specific order, or that all the illustrated operations should be executed to achieve the desired results. Additionally or optionally, some steps may be omitted, a plurality of steps may be combined into one step for being executed, and/or one step may be decomposed into a plurality of steps for execution.

A person of ordinary skill in the art should understand that the embodiment of the disclosure may be provided in the form of a method, a system, or a computer program product. Based on that, the disclosure may take the form of a full hardware embodiment, a full software embodiment, or an embodiment combining software and hardware. Further, the disclosure may take the form of a computer program product implemented on one or more computer-usable storage media (including but not limited to a disk memory, a CD-ROM, an optical memory, etc.) including computer-usable program codes.

The disclosure is described with reference to the flowcharts and/or block diagrams of the method, the device (system), and the computer program product according to the embodiments of the disclosure. It should be understood that computer program instructions may be used to implement each process and/or each block in the flowcharts and/or the block diagrams and a combination of a process and/or a block in the flowcharts and/or the block diagrams. These computer program instructions may be provided for a processor of a general-purpose computer, a special-purpose computer, an embedded processing machine, or other programmable data processing device to produce a server, such that instructions executed by the processor of the computer or other programmable data processing device produce a device used for implementing a function specified in one or more flows of the flowchart and/or one or more blocks of the block diagram.

Computer program codes for executing the operations of the disclosure may be written in any combination of one or more programming languages, and the programming languages include object-oriented programming languages, such as Java and C++, and further include conventional procedural programming languages such as "C" language or similar programming languages. The program codes may be completely executed on a computation apparatus of the user, partially executed on the user equipment, executed as an independent software package, partially executed on the computation apparatus of the user and a remote computation apparatus separately, or completely executed on the remote computation apparatus or the server.

In the case of involving the remote computation apparatus, the remote computation apparatus may be connected to the computation apparatus of the user through any type of network, including a local area network (LAN) or a wide area network (WAN), or may be connected to an external computation apparatus (for example, through the Internet provided by an Internet service provider).

These computer program instructions may be stored in a computer readable memory that may instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto the computer or other programmable data processing devices, such that a series of operating steps are performed on the computer or other programmable device to generate computer-implemented processing, and instructions executed on the computer or other programmable device provide steps for implementing the functions specified in the one or more flows of the flowchart and/or one or more blocks in the block diagram.

Apparently, those skilled in the art can make various modifications and variations to the disclosure without departing from the spirit and scope of the disclosure. Thus, the disclosure is intended to include such modifications and variations which fall within the scope of the appended claims of the disclosure and their equivalents as well.

What is claimed is:

1. A method for compensating for nonlinear distortion of a signal, comprising:

inputting an initial orthogonal frequency division multiplexing (OFDM) signal into a preset nonlinear compensation fusion model, wherein the nonlinear compensation fusion model comprises a band limited-digital pre-distortion (BL-DPD) module, a band limited-crest factor reduction (BL-CFR) module and an error compensation module, and the error compensation module is configured to perform error compensation on OFDM signals that are output by the BL-DPD module and the BL-CFR module;

obtaining a first OFDM signal, a second OFDM signal and a third OFDM signal after the initial OFDM signal is processed by the BL-DPD module, the BL-CFR module and the error compensation module respectively; and obtaining, based on the first OFDM signal, the second OFDM signal and the third OFDM signal, an initial OFDM signal after nonlinear distortion compensation.

2. The method according to claim 1, wherein a basis function adopted by the BL-DPD module and a basis function adopted by the BL-CFR module are the same.

3. The method according to claim 1, wherein the obtaining the first OFDM signal, the second OFDM signal and the third OFDM signal after the initial OFDM signal is processed by the BL-DPD module, the BL-CFR module and the error compensation module, respectively, comprises:

obtaining the first OFDM signal, the second OFDM signal and the third OFDM signal by modulating the initial OFDM signal based on model parameter sets, that are converged in an offline mode, of the BL-DPD module, the BL-CFR module and the error compensation module respectively.

4. The method according to claim 3, wherein the model parameter set comprises any one of following parameter combinations:

a kernel coefficient, a nonlinear order, a memory depth, and an order of a low-order low-pass filter (LPF) of the BL-DPD module;

a kernel coefficient, a nonlinear order, a memory depth, and an order of a low-order LPF of the BL-CFR module; or a kernel coefficient, a nonlinear order and a memory depth of the error compensation module.

5. The method according to claim 4, wherein under a condition that the parameter combination of the model parameter set comprises the kernel coefficient, the nonlinear order, the memory depth, and the order of the low-order LPF of the BL-DPD module, the model parameter set is obtained by a following method:

inputting a sample OFDM signal that is in an offline mode into the BL-DPD module and obtaining a sample OFDM signal after DPD;

obtaining, based on the sample OFDM signal after the DPD and a conjugate parameter set corresponding to an initial parameter set of the BL-DPD module, a sample OFDM signal after inverse DPD;

obtaining a target DPD error signal based on the sample OFDM signal that is in the offline mode and the sample OFDM signal after the inverse DPD;

iteratively modifying the initial parameter set based on the target DPD error signal and a preset low noise variable step size-least mean square algorithm until an absolute value of the target DPD error signal is less than a DPD error signal threshold that is set; and taking, as the model parameter set of the BL-DPD module, an initial parameter set after the iteratively modifying;

wherein before the iteratively modifying the initial parameter set based on the target DPD error signal and the preset low noise variable step size-least mean square algorithm, the method further comprises:

directly taking the initial parameter set as the model parameter set of the BL-DPD module under a condition that the absolute value of the target DPD error signal is not less than the DPD error signal threshold.

6. The method according to claim 5, wherein the obtaining, based on the sample OFDM signal after the DPD and the conjugate parameter set corresponding to the initial parameter set of the BL-DPD module, the sample OFDM signal after inverse DPD comprises:

sequentially performing digital-to-analog conversion, up conversion and power amplification on the sample OFDM signal after the DPD and obtaining a sample OFDM signal after the power amplification;

sequentially performing power attenuation, down conversion and analog-to-digital conversion on the sample OFDM signal after the power amplification and obtaining a sample OFDM signal after the analog-to-digital conversion; and obtaining, based on the sample OFDM signal after the analog-to-digital conversion and the conjugate parameter set corresponding to the initial parameter set, the sample OFDM signal after the inverse DPD.

7. The method according to claim 5, wherein the iteratively modifying the initial parameter set based on the target DPD error signal and the preset low noise variable step size-least mean square algorithm comprises:

executing operations during each modification of the initial parameter set as follows:

obtaining a plurality of sample OFDM signals that correspond to a plurality of historical moments respectively and are currently adjacent to the sample OFDM signal that is in the offline mode;

obtaining a DPD error signal average of the sample OFDM signal that is in the offline mode at a current moment based on historical DPD error signals corresponding to the plurality of sample OFDM signals;

obtaining a first target step size factor based on the DPD error signal average, a step size factor at a last historical moment that is adjacent to the current moment, a target DPD error signal that is at the current moment and a historical DPD error signal that is at the last historical moment; and modifying an initial parameter set that is at the current moment based on the first target step size factor, a conjugate DPD error signal corresponding to the target DPD error signal that is at the current moment, and the sample OFDM signal after the analog-to-digital conversion, and obtaining an initial parameter set after modification.

8. The method according to claim 4, wherein under a condition that the parameter combination of the model parameter set comprises the kernel coefficient, the nonlinear order, the memory depth, and the order of the low-order LPF of the BL-CFR module, the model parameter set is obtained by a following method:

inputting a sample OFDM signal that is in an offline mode sequentially into the BL-DPD module and a preset CFR module, and obtaining a sample OFDM signal after DPD-CFR;

obtaining, based on the sample OFDM signal that is in the offline mode and a conjugate parameter set corresponding to an initial parameter set of the BL-CFR module, a sample OFDM signal after CFR;

obtaining a target CFR error signal based on the sample OFDM signal after the DPD-CFR and the sample OFDM signal after the CFR;

iteratively modifying the initial parameter set based on the target CFR error signal and a preset low noise variable step size-least mean square algorithm until an absolute value of the target CFR error signal is less than a CFR error signal threshold that is set; and taking, as the model parameter set of the BL-CFR module, an initial parameter set after the iteratively modifying;

wherein before the iteratively modifying the initial parameter set based on the target CFR error signal and the preset low noise variable step size-least mean square algorithm, the method further comprises:

directly taking the initial parameter set as the model parameter set of the BL-CFR module under a condition that the absolute value of the target CFR error signal is not less than the CFR error signal threshold.

9. The method according to claim 4, wherein under a condition that the parameter combination of the model parameter set comprises the kernel coefficient, the nonlinear order and the memory depth of the error compensation module, the model parameter set is obtained by a following method:
obtaining a sample OFDM signal after nonlinear distortion compensation and a sample OFDM signal after filtering by inputting a sample OFDM signal that is in an offline mode into the nonlinear compensation fusion model and a preset high-order LPF, respectively;
obtaining a target compensation error signal based on the sample OFDM signal after the nonlinear distortion compensation and the sample OFDM signal after the filtering;
iteratively modifying an initial parameter set of the error compensation module based on the target compensation error signal and a preset low noise variable step size-least mean square algorithm until an absolute value of the target compensation error signal is less than a compensation error signal threshold that is set; and
taking, as the model parameter set of the error compensation module, an initial parameter set after the iteratively modifying;
wherein before the iteratively modifying an initial parameter set of the error compensation module based on the target compensation error signal and the preset low noise variable step size-least mean square algorithm, the method further comprises:
directly taking the initial parameter set as the model parameter set of the error compensation module under a condition that the absolute value of the target compensation error signal is not less than the compensation error signal threshold.

10. The method according to claim 1, wherein after the obtaining, based on the first OFDM signal, the second OFDM signal and the third OFDM signal, the initial OFDM signal after nonlinear distortion compensation, the method further comprises:
obtaining, based on the initial OFDM signal after the nonlinear distortion compensation and a conjugate parameter set corresponding to a model parameter set of the BL-DPD module, an initial OFDM signal after inverse DPD;
obtaining a target distortion compensation error signal based on the initial OFDM signal after the nonlinear distortion compensation and the initial OFDM signal after the inverse DPD; and
iteratively modifying the model parameter set based on the target distortion compensation error signal and a preset sine and error variable step size-least mean square algorithm until an absolute value of the target distortion compensation error signal is less than a distortion compensation error threshold that is set.

11. The method according to claim 10, wherein the obtaining, based on the initial OFDM signal after the nonlinear distortion compensation and the conjugate parameter set corresponding to the model parameter set of the BL-DPD module, the initial OFDM signal after inverse DPD comprises:
sequentially performing digital-to-analog conversion, up conversion and power amplification on the initial OFDM signal after the nonlinear distortion compensation and obtaining an initial OFDM signal after the power amplification;
sequentially performing power attenuation, down conversion and analog-to-digital conversion on the initial OFDM signal after the power amplification and obtaining an initial OFDM signal after the analog-to-digital conversion; and
obtaining, based on the initial OFDM signal after the analog-to-digital conversion and the conjugate parameter set corresponding to the model parameter set, the initial OFDM signal after the inverse DPD.

12. The method according to claim 10, wherein the iteratively modifying the model parameter set based on the target distortion compensation error signal and the preset sine and error variable step size-least mean square algorithm comprises:
performing operations during each modification of the model parameter set as follows:
obtaining a plurality of sample OFDM signals that are obtained after the nonlinear distortion compensation, correspond to a plurality of historical moments respectively and are currently adjacent to the initial OFDM signal after the nonlinear distortion compensation;
obtaining a distortion compensation error signal average of the initial OFDM signal after the nonlinear distortion compensation at a current moment based on historical distortion compensation error signals corresponding to the plurality of sample OFDM signals after the nonlinear distortion compensation;
obtaining a second target step size factor based on an error term corresponding to the distortion compensation error signal average, a target distortion compensation error signal that is at the current moment, and a historical distortion compensation error signal at a last historical moment that is adjacent to the current moment; and
modifying a model parameter set that is at the current moment based on the second target step size factor, a conjugate distortion compensation error signal corresponding to the target distortion compensation error signal that is at the current moment, and an initial OFDM signal after analog-to-digital conversion, and obtaining a model parameter set after modification.

13. The method according to claim 10, further comprising:
iteratively modifying the model parameter set of the BL-DPD module according to set cycle time.

14. An electronic device, comprising: a memory, a processor, and a computer program that is stored on the memory and executable by the processor, wherein the processor implements the method according to claim 1 when executing the computer program.

15. A non-transitory computer readable storage medium, storing a computer program, wherein a processor implements steps of the method of claim 1 when the computer program is executed by the processor.

16. A nonlinear compensation fusion model, comprising: a band limited-digital pre-distortion (BL-DPD) module, a band limited-crest factor reduction (BL-CFR) module and an error compensation module; wherein
the BL-DPD module, the BL-CFR module and the error compensation module are connected in parallel, and the error compensation module is configured to perform error compensation on orthogonal frequency division multiplexing (OFDM) signals that are output by the BL-DPD module and the BL-CFR module.

17. The nonlinear compensation fusion model according to claim 16, wherein a basis function adopted by the BL-DPD module and a basis function adopted by the BL-CFR module are the same.

18. The nonlinear compensation fusion model according to claim 16, wherein the nonlinear compensation fusion model is configured to:
obtain a first OFDM signal, a second OFDM signal and a third OFDM signal after an initial OFDM signal is processed by the BL-DPD module, the BL-CFR module and the error compensation module respectively; and
obtain, based on the first OFDM signal, the second OFDM signal and the third OFDM signal, an initial OFDM signal after nonlinear distortion compensation;
or
wherein the nonlinear compensation fusion model is further configured to:
extract, in an offline mode, model parameter sets for the BL-DPD module, the BL-CFR module and the error compensation module by using a preset low noise variable step size-least mean square algorithm;
or
wherein the nonlinear compensation fusion model is further configured to:
refresh, in an online mode, a model parameter set of the nonlinear compensation fusion model by using a preset sine and error variable step size-least mean square algorithm and based on preset cycle time;
or
wherein the nonlinear compensation fusion model is specifically configured to:
refresh, in an online mode, a model parameter set of the BL-DPD module in the nonlinear compensation fusion model merely by using the preset sine and error variable step size-least mean square algorithm and based on the preset cycle time.

19. An orthogonal frequency division multiplexing (OFDM) communication system, comprising: the nonlinear compensation fusion model according to claim 16, a first branch, a second branch, a third branch and a fourth branch, wherein
the BL-DPD module in the nonlinear compensation fusion model and the first branch are configured to iteratively modify an initial parameter set of the BL-DPD module in an offline mode and obtain a model parameter set of the BL-DPD module;
the BL-CFR module in the nonlinear compensation fusion model and the second branch are configured to iteratively modify an initial parameter set of the BL-CFR module in an offline mode and obtain a model parameter set of the BL-CFR module;
the error compensation module in the nonlinear compensation fusion model and the third branch are configured to iteratively modify an initial parameter set of the error compensation module in an offline mode and obtain a model parameter set of the error compensation module; and
the nonlinear compensation fusion model and the fourth branch are configured to iteratively modify the model parameter set of the BL-DPD module in an online mode.

20. The OFDM communication system according to claim 19, wherein the first branch comprises a digital to analog converter (DAC), an up-converter, a power amplifier (PA), an attenuator, a band pass filter (BPF), a down-converter, an analog to digital converter (ADC), a training network POST-BL-DPD module and a preset low noise variable step size-least mean square algorithm module that are sequentially arranged;
or
wherein the second branch comprises a CFR module, a training network POST-BL-DPD module and a preset low noise variable step size-least mean square algorithm module that are sequentially arranged;
or
wherein the third branch comprises a low pass filter (LPF) and a preset low noise variable step size-least mean square algorithm module that are sequentially arranged;
or
wherein the fourth branch comprises the DAC, the up-converter, the PA, the attenuator, the BPF, the down-converter, the ADC, the training network POST-BL-DPD module and a preset sine and error variable step size-least mean square algorithm module that are sequentially arranged.

* * * * *